(12) United States Patent
Nagarkar et al.

(10) Patent No.: US 7,723,687 B2
(45) Date of Patent: May 25, 2010

(54) LANTHANIDE HALIDE MICROCOLUMNAR SCINTILLATORS

(75) Inventors: Vivek Nagarkar, Weston, MA (US); Valeriy Gaysinskiy, Allston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

(21) Appl. No.: 11/773,356

(22) Filed: Jul. 3, 2007

(65) Prior Publication Data

US 2009/0008561 A1 Jan. 8, 2009

(51) Int. Cl.
*G01T 1/20* (2006.01)
(52) U.S. Cl. .................................................. 250/361 R
(58) Field of Classification Search ............. 250/361 R, 250/484.4
See application file for complete search history.

(56) References Cited

U.S. PATENT DOCUMENTS

| 5,171,996 | A | 12/1992 | Perez-Mendez |
| 5,427,817 | A | 6/1995 | Goodman et al. |
| 5,536,323 | A | 7/1996 | Kirlin et al. |
| 6,468,305 | B1 | 10/2002 | Otte |
| 6,720,026 | B2* | 4/2004 | Fuchs et al. ................. 427/65 |
| 6,781,131 | B2* | 8/2004 | Kusuyama et al. .......... 250/368 |
| 6,933,502 | B2* | 8/2005 | Okada et al. ................ 250/367 |
| 7,180,068 | B1* | 2/2007 | Brecher et al. ........... 250/361 R |
| 2005/0072931 | A1* | 4/2005 | Albagli et al. ........ 250/370.11 |
| 2005/0082484 | A1* | 4/2005 | Srivastava et al. ....... 250/361 R |
| 2007/0272867 | A1* | 11/2007 | Tahon et al. ............ 250/361 R |

OTHER PUBLICATIONS

Tornai et al, "Investigation of Micro-Columnar scintillators on an optical fiber coupled compact imaging system", Nuclear Science Symposium Conference Record, 2000 IEEE, vol. 3, Iss., Oct. 15-20, 2000, pp. 21/19-21/23.*
BrilLanCe™ 350 crystal product information, <http://www.detectors.saint-gobain.com>, 3 pages (retrieved on Nov. 9, 2007).
Miller et al., "Single-photon spatial and energy resolution enhancement of a columnar CsI (T1) / EMCCD gamma-camera using maximum-likelihood estimation," *Proc. SPIE* 6142 (2006).
Nagarkar et al., "Structured CsI (T1) Scintillators for X-ray imaging applications," *IEEE Trans. Nucl. Sci.* 45:492-496 (1998).
Shah et al., "LaBr3:Ce scintillators for gamma ray spectroscopy," *IEEE Trans. Nucl. Sci.*, Paper LBNL-51793: (2002).
Shah et al., "CeBr$_3$ scintillators for gamma-ray spectroscopy," *IEEE Trans. Nucl. Sci.* 52:3157-3159 (2005).

* cited by examiner

*Primary Examiner*—David P Porta
*Assistant Examiner*—Kiho Kim
(74) *Attorney, Agent, or Firm*—Townsend and Townsend and Crew LLP

(57) ABSTRACT

The present invention provides an imaging scintillation radiation detector comprising a doped lanthanide halide microcolumnar scintillator formed on a substrate. The scintillation radiation detectors of the invention typically comprise a substrate. The substrate can be either opaque or optically transparent. In a particular embodiment of the present invention the microcolumnar scintillator is a lanthanide-halide (LaHalide$_3$) doped with at least cerium. The invention also provides methods for the vapor deposition of a doped microcolumnar lanthanide-halide scintillator film.

29 Claims, 10 Drawing Sheets

Figure 10(a)　　　　　　　　Figure 10(b)
Figure 10(c)　　　　　　　　Figure 10(d)

LANTHANIDE HALIDE MICROCOLUMNAR SCINTILLATORS

BACKGROUND OF THE INVENTION

Computed Tomography, including both transmission (CT) and emission (PET and SPECT), is a powerful tool for non-invasively imaging anatomical structures and biological processes in small laboratory animals. With the ever-increasing number of human disease models, particularly in smaller animals such as mice and rats, the ability of high-resolution computed tomography to contribute unique information has become apparent to many researchers. Among various imaging modalities, single photon emission computed tomography (SPECT) allows the physiological study of disease models in small animals as well as in patient care. Suitable single-photon-emitting radiotracers are available for measuring a wide range of biological parameters of importance including substrate metabolism, blood flow, hypoxia, protein synthesis, and receptor characteristics. SPECT is capable of dual-isotope imaging for correlating two biological processes within a single imaging study as well as imaging trans-gene expression in vivo. In addition, radiolabeled antibodies are available that can be used to localize and characterize tumors in small animals, and they hold promise for diagnosis and treatment of cancer in humans.

The utility of SPECT has been significantly enhanced in recent years by the development of dual-modality imaging, which combines radionuclide imaging with anatomical imaging. Dual-modality imaging is typically achieved by combining SPECT images with images from x-ray CT or magnetic resonance imaging (MRI), fusing images pixel-to-pixel and simultaneously displaying selected functional and anatomical information. However, the functional and anatomical images may be geometrically inconsistent when they are obtained at different times on different pieces of equipment and with differing imaging geometries. Sequential dual-modality imaging results in increased study time, miss-registration errors, and complicated diagnostic procedures. CCD based x-ray/γ-ray detectors are being developed and have shown significant promise in overcoming these difficulties by performing near simultaneous combined SPECT/CT imaging using a single detector.

The main barriers to using SPECT or combined SPECT/CT in studies of laboratory animals have traditionally been poor spatial resolution, low sensitivity, and high cost. While most of the currently available SPECT systems are based on scintillation crystals coupled to position-sensitive photomultiplier tubes (PSPMTs), new design approaches that make use of charge coupled devices (CCDs) and position sensitive avalanche photodiodes (PSAPDs) have been shown to be effective in substantially improving the detector sensitivity and spatial resolution. Unfortunately, the current state-of-the-art scintillator technology remains the primary performance-limiting factor. A scintillator that simultaneously provides high spatial resolution, excellent stopping efficiency, high light output, fast response, and low cost is needed for small animal SPECT or combined SPECT/CT imaging.

A wide variety of new scintillators have recently become available that have characteristics that make them useful for radiation detection. Two new cerium doped halide scintillators, lanthanum chloride and lanthanum bromide ($LaCl_3$:Ce and $LaBr_3$:Ce) have shown potential to fulfill the requirements of scintillators used in such radiation detection methods as small animal single positron emission computed tomography (SPECT), computed tomography (CT), and combined SPECT/CT.

Crystals of $LaCl_3$:Ce have one of the highest conversion efficiencies among known scintillators (~50,000 photons/MeV), rapid decay time (20 ns), and a stopping efficiency comparable to that of NaI:Tl. Moreover, $LaCl_3$:Ce shows very good linearity in energy response and has demonstrated two times better energy resolution than NaI:Tl (<3% at approximately 662 keV). The peak emission wavelength for $LaCl_3$:Ce is $\lambda_{max}$~350 nm which is well matched to the quantum efficiency of photomultiplier tubes and is acceptable for new Si photodiodes (both unity gain p-i-n and avalanche Si diodes). These detectors are currently being considered for compact γ-camera and SPECT systems. The photon peak emissions are also appropriate for back thinned, ultra violet B (UVB) charge-coupled devices (CCDs) being used in SPECT/CT applications. $LaCl_3$:Ce is therefore expected to find extensive use in nuclear medicine and digital radiology.

Crystals of $LaBr_3$:Ce also has characteristic that are better than those of NaI:Tl. It has one of the highest conversion efficiencies among known scintillators (>63,000 photons/MeV), rapid decay time (16 ns), and a high stopping efficiency. Moreover, $LaBr_3$:Ce shows very good linearity in energy response and has demonstrated two times better energy resolution than NaI:Tl (<3% at about 662 keV). The peak emission wavelength for $LaBr_3$:Ce is $\lambda_{max}$~380 nm which like $LaCl_3$:Ce, is well matched to the quantum efficiency of photomultiplier tubes (e.g., MAPMTs) and is acceptable for new Si photodiodes (both unity gain p-i-n and avalanche Si diodes). Further, the photon emissions are also appropriate for back thinned, UVB CCDs being used in SPECT/CT applications. As with $LaCl_3$:Ce, $LaBr_3$:Ce is expected to find extensive use in nuclear medicine and digital radiology.

Despite the obvious advantages of Lanthanum halide crystals, as exemplified by $LaCl_3$:Ce and $LaBr_3$:Ce, to date only single crystals of each have been grown and made commercially available. (Saint-Gobain Crystals and Detectors, Ohio; BrilLanCe®350 and BrilLanCe®380). Crystalline growth of these halide materials using art standard melt methods is difficult due to the stringent growth condition requirements, resulting in high production costs and limited availability. In addition, the crystals produced are usually no larger than about 5×5 $cm^2$. Furthermore, growth from the standard melt process under equilibrium conditions tends to reject impurities from the crystal lattice, whether wanted or not, resulting in a non-uniform distribution of dopant. This causes variation in light output within the crystal and degrades the energy resolution. Finally, for these crystalline materials to be useful in high spatial resolution applications, it is necessary to produce it in a pixilated array form. This is challenging because $LaHalide_3$:Ce is a highly hygroscopic material, making pixilation difficult and expensive. Thus, new, practical, and cost effective technologies are needed for producing structured arrays with controlled stochiometry, as are methods for protecting them from atmospheric moisture during and after fabrication.

For a CT or digital radiography detector, important performance criteria are area coverage (arrays of at least 5×5 $cm^2$ for small animals and 20×25 $cm^2$ or larger for human imaging); spatial resolution (better than 70 µm); dose efficiency; and speed of operation. Additionally, the scintillator used in the detector should have a rapid decay with no significant afterglow in order to minimize reconstruction artifacts due to image blurring in CT. Higher signal-to-noise ratios and dose efficiency are critical for minimizing radiation dose, and speed of operation is necessary for enhanced throughput and to resolve time-dependent phenomena. Additionally, a wide dynamic range of at least 10 bits for small animals and 16 bits for imaging humans is needed, with excellent linearity of response to dose. Thus, with its fast decay time, enhanced emission, excellent energy resolution, and high degree of response linearity, $LaHalide_3$:Ce, could provide an appropriate scintillator if an efficient method and structure could be obtained to meet the requirements of high-resolution medical imaging.

To achieve high spatial resolution many of the current commercial SPECT systems rely on image magnification. This translates into the requirement that the detector must have a very large imaging area. For example, the Nano-SPECT™ system developed by BioScan, Inc. provides reconstruction resolution on the order of 100 μm using four NaI(Tl) detectors, each consisting of a 4.0×4.0×0.5 $cm^3$ scintillator coupled to an array of PMTs. Crystals of $LaBr_3$:Ce or $LeBr_3$:Ce would likely substantially improve the performance of this instrument given their superior properties, but the cost and time of production of crystals of these lanthanide halides makes the use of the materials prohibitively expensive. Current methods would require many weeks to grow crystals of an appropriate size and they would still require that the crystals be cut, shaped and polished after growth.

Traditionally, scintillation crystals coupled to photomultiplier tubes are the most common detectors in small animal imaging systems such as SPECT, PET, and gamma cameras. With the advent of new readout technologies such as pixilated avalanche photodiodes (APDs) and position-sensitive APDs, position sensitive photomultiplier tubes, and high speed CCDs, the choice of scintillator not only depends on its emission properties, but also on the spatial resolution requirements of the application. Comparisons of common inorganic scintillators used in such applications are well known in the art and can be found, for example in (U.S. Pat. No. 7,129,494). For most SPECT and gamma camera designs, NaI:Tl is the scintillator of choice at present. NaI:Tl has good light output, moderate speed, and its energy emission is well matched to photomultiplier tubes typically in use. Faster decay time and higher stopping efficiency would be desirable to achieve higher count-rates.

CsI:Tl is another common scintillator which is being used in SPECT and gamma camera designs consisting of silicon photodiodes or Si CCDs as optical sensors. In addition to excellent scintillator properties of the CsI:Tl, the fact that it can be grown in a columnar form has made it a scintillator of choice in many high resolution imaging applications such as radiography and CT. While the light output of CsI:Tl is higher than that of NaI:Tl, its decay time is even longer. The substantial afterglow associated with CsI:Tl makes it impractical for use in CT and also limits the maximum achievable count rate in some radionuclide imaging applications. Furthermore, its wavelength of emission is not very well matched to typical photomultiplier tubes used in these systems and improvement in the energy resolution of CsI:Tl is needed for some nuclear medicine imaging applications.

Other scintillators such as lutetium oxyothosilicate (LSO) and bismuth germanate (BGO) appear to be promising for PET due to their high gamma-ray stopping efficiency. However, LSO and BGO are not being considered for SPECT and/or CT due to their relatively low light output or lack of high spatial resolution which can provide practical limitations to the use of these materials when considered for pixilation. LSO is also expensive, has a radioactive component, and is not readily available in large volumes. Yttrium aluminum perovskite (YAP) has been investigated in recent designs of SPECT systems for small animals, however YAP has low light output limits, and its signal-to-noise ratio (SNR) for low energy γ-rays (e.g., 26-35 keV from $^{125}$I) can be a limitation, especially with a silicon photodiode readout.

Thus, there is an unmet need for an imaging scintillation radiation detector, which has high spatial resolution, high light output, fast response, adequate stopping efficiency, and which can provide sufficient energy resolution and surface area for small animal imaging. In order to provide high spatial resolution, the imaging scintillation radiation detector needs to be grown in a fine crystalline needle form (a microcolumnar structure), a structure which minimizes the traditional tradeoff between spatial resolution and absorption efficiency as is disclosed in this application.

Some of the established inorganic scintillators such as NaI:Tl, and CsI:Tl, which are commonly used in gamma-ray spectroscopy applications, are bright but have moderate energy resolution (~6-7% FWHM for 662 keV photons). It is important to note that the energy resolution of these alkali-halide scintillators (and other non-alkali-halide scintillators such as LSO) is significantly worse than that expected from counting statistics (based on their light output). This issue is illustrated in FIG. 1, which plots, for a variety of alkali-halide and non-alkali-halide scintillators, the energy resolution (for 662 keV gamma-ray excitation) as a function of the mean number of photoelectrons (observed with a photomultiplier tube). The measured energy resolution of most scintillators lies considerably above the solid curve which represents the theoretical resolution based on counting statistics; the energy resolution of most scintillators is worse than expected from counting statistics.

It should also be noted that even small crystals of alkali-halide scintillators show poor energy resolution, which indicates that the degradation in energy resolution is not completely accounted for by, for example, self-absorption of light emissions and spatial non-uniformity of the dopant. The present consensus is that the main cause for degradation in the energy resolution of common scintillators, such as, for example, CsI:Tl, NaI:Tl and LSO, is non-proportionality. The luminous efficiency (i.e., the number of scintillation photons per unit energy) of the scintillator depends on the energy of the particle that excites it. A gamma-ray begins the excitation process by creating a knock-on electron by either photoelectric absorption or Compton scatter. As this primary electron traverses the scintillator, it loses energy to the scintillator (exciting it) and also produces other relatively high-energy electrons (delta-rays), which also excite the scintillator. Thus, a number of electrons will effectively excite the scintillator, even when the primary excitation source is a single gamma-ray. If the luminous efficiency is independent of the electron energy, then the number of scintillation photons produced by two γ-rays with the same energy will be the same (within counting statistics) because the sum of the electron energies is the same (and equal to the incident gamma energy). However, if the luminous efficiency depends on electron energy, then the number of scintillation photons will not necessarily be the same, and these variations can degrade the energy resolution.

Dependence of luminous efficiency on electron energy has been measured using a Compton technique, and the results for common alkali-halide scintillators are shown in FIG. 2. Ideally, the lines should be horizontal, indicating no dependence on electron energy. None of the alkali-halides possess this ideal shape, and these materials which are significantly above the theoretical curve in FIG. 1 also possess significant non-linearity (a steep slope in FIG. 2, especially at lower electron energies). Other non-alkali halide scintillators such as LSO and BGO also show strong dependence of luminous efficiency on electron energy. On the other hand, $YAlO_3$:Ce (or YAP) shows minimal dependence between the luminous efficiency and the electron energy, which explains the agreement between its measured energy resolution and the estimated one (based on photon statistics) as shown in FIG. 1. Unfortunately, the light output of YAP is not very high.

Thus, in order to obtain a particularly useful energy resolution with scintillation crystals, it is important to have high light output, and minimal dependence between the luminous efficiency and the electron energy. Microcolumnar films of the present invention comprising a lanthanide halide, e.g., lanthanum halide (LaHalide), doped scintillator composition, including microcolumnar films of $LaCl_3$:Ce, $LaBr_3$:Ce, and the like; provide such materials that are capable of providing useful energy resolution. Methods for the production of these microcolumnar films of lanthanide halide scintillators are also provided.

BRIEF SUMMARY OF THE INVENTION

The present invention provides an imaging scintillation radiation detector comprising a doped lanthanide halide microcolumnar scintillator formed on a substrate. The lanthanide used in the scintillator can include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). The halide used in formation of the microcolumnar scintillator can include, for example, chlorine, bromine, fluorine, or iodide. Dopants usable in forming microcolumnar scintillator films can include at least one of cerium (Ce), europium (Eu), praseodymium (Pr), dysprosium (Dy), samarium (Sm), thallium (Tl), chlorine (Cl), fluorine (Fl), or iodide (I). In a particular embodiment of the present invention, the lanthanide halide microcolumnar scintillator is doped with at least cerium. In certain embodiments of the invention, the microcolumnar scintillator comprise $LaCl_3$:Ce, $LaBr_3$:Ce, $LeCl_3$:Ce, $LeBr_3$:Ce, $GdI_3$, $EuI_3$, $EuCl_3$, $SmI_3$, and the like.

The scintillation radiation detectors of the invention typically comprise a substrate. The substrate can be either opaque or optically transparent. Opaque substrates used in the invention can be naked or can be comprised of at least one of a coating of a reflective material and/or a protective material. Protective coating useful in the microcolumnar scintillators of the invention can comprise a para-xylylene polymer composition. In a particular embodiment of the present invention, the para-xylylene polymer composition is parylene. The optically transparent coating can comprise at least one of a coating of an optically transparent protective material. Suitable optically transparent protective materials comprise a para-xylylene polymer composition. In particular, the scintillation detector can further comprise at least a protective coating on the surfaces of the scintillator not in contact with the substrate. In a typical embodiment, the protective coating comprises a para-xylylene polymer composition; wherein parylene is commonly used.

In a further embodiment, the present invention comprises an imaging scintillation radiation detector device comprising a radiation source, and a doped lanthanide halide microcolumnar scintillator formed on a substrate, wherein said scintillator is optically coupled to an imaging photodetector. The microcolumnar scintillator of the radiation detector can comprise a halide that is, for example, chlorine, bromine, fluorine, iodine, and the like. The dopant used can be at least one of cerium (Ce), europium (Eu), praseodymium (Pr), dysprosium (Dy), samarium (Sm), thallium (Tl), chlorine (Cl), fluorine (Fl), or iodide (I). In a typical embodiment, the dopant is at least cerium.

The imaging scintillation radiation detector of the present invention can comprise a substrate that is opaque or optically transparent. Typically, the opaque substrate can be naked or can comprise at least one of a coating of a reflective material and a protective material. The protective material can comprise a para-xylylene polymer composition. In a typical embodiment of the present invention, the para-xylylene polymer composition is parylene. When the substrate is optically transparent, the substrate can comprise at least one of a coating of an optically transparent protective material. Optically transparent protective materials useful in the present invention can comprise a para-xylylene polymer composition. In certain embodiments, the microcolumnar scintillator film can further comprise at least a protective coating on the surfaces of the scintillator not in contact with the substrate. The protective coating can comprise a para-xylylene polymer composition. In particular embodiments of the invention the para-xylylene polymer composition is parylene. Optionally, when the substrate is optically transparent, the coating on the surface opposite the substrate can comprise a reflective material. The reflective material increases the light output of the scintillator, while also reducing the spatial resolution.

In a further embodiment of the present invention, a method for fabricating an imaging scintillation radiation detector is provided. The radiation detector comprises a doped lanthanide halide microcolumnar scintillator formed on a substrate. The method comprises: placing a substrate in an evacuatable chamber; creating a high-vacuum in said chamber; and co-evaporating salts of lanthanide-halide and dopant-halide in the chamber. The lanthanide can be lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), or lutetium (Lu). The halide can be chlorine, bromine, fluorine, or iodine and the dopant can be at least one of cerium (Ce), europium (Eu), praseodymium (Pr), dysprosium (Dy), samarium (Sm), thallium (Tl), chlorine (Cl), fluorine (Fl), or iodine (I). In a specific embodiment of the invention, the lanthanide is Lanthanum, the halide is Cl and/or Br, and the dopant is cerium. Other embodiments of the invention include, for example, $GdI_3$, $EuI_3$, and $SmI_3$, and the like.

In the method of the invention, the substrate can be opaque or optically transparent. When the substrate is opaque, the substrate can comprise at least one of a coating of a reflective material and a protective material. The protective material can comprise a para-xylylene polymer composition. In a particular embodiment, the para-xylylene polymer composition is parylene. In embodiments where the substrate is optically transparent, the substrate can comprise at least one of a coating of an optically transparent protective material. The optically transparent protective material can comprise a para-xylylene polymer composition. In a particular embodiment, the scintillator film can further comprise at least a protective coating or a protective coating on the surfaces of the scintillator not in contact with the substrate. The para-xylylene polymer can be parylene.

In the methods of the invention the salts of the scintillator and the dopant can be evaporated from different containers. As the temperature of the lanthanide halide source boat is high, for example, between 1.2 and 1.3 times the melting temperature of the lanthanide halide, and the source containers are close to the substrate, in certain embodiments of the invention the substrate is cooled sufficiently to allow the lanthanide halide to form a microcolumnar scintillator film.

In another embodiment of the present invention a method is provided for fabricating an imaging scintillation radiation detector comprising a doped lanthanide halide microcolumnar scintillator formed on a substrate, the method comprises the steps of placing a substrate in a evacuatable chamber; creating a high-vacuum in said chamber; and co-evaporating salts of lanthanide-halide and dopant-halide in the chamber.

BRIEF DESCRIPTION OF THE DRAWINGS

FIG. 4(a) is an SEM micrograph top view of a 180 μm thick microcolumnar film of $LeBr_3$:Ce deposited at a 480° C. substrate temperature. FIG. 4(b) is a side view of the 180 μm film demonstrating well-separated columns of the film. It should be noted that the columns start at the substrate. FIG. 4(c) is a SEM micrograph top view of a 225 μm thick film deposited at 250° C. substrate temperature. FIG. 4(d) is a side view of the 225 μm film demonstrating finer column diameter than the film deposited at a lower substrate temperature.

FIG. 6(a) depicts the decay time of the film using a 20 ns wide x-ray pulse. The measured 1/e decay time is approximately 30 ns, which matches with the 16 to 28 ns reported for the commercial crystals (Del Guerra et al., *IEEE Trans. Nuc. Sci.* 47:1537, 2000). FIG. 6(b) provides the afterglow measurements using 100 kVp, 200 mAs x-rays from a 60 kW source. These data demonstrate the absence of persistence in the films.

FIG. 9(a) is a radiograph using a 180 μm thick $LaBr_3$:Ce film deposited at a high substrate temperature. FIG. 9(b) is a radiograph using a 225 μm thick $LaBr_3$:Ce film deposited at a low substrate temperature.

FIGS. 10(a) through 10(d) depict radionuclide images using a 225 μm thick $LaBr_3$:Ce film. FIG. 10(a) is one frame of an image of a 0.5 mm slit taken with a $^{57}Co$ source. Individual gamma-ray interactions are visible against a random background from the image intensifier. FIG. 10(b) is a frame from FIG. 10(a) after smoothing and thresholding. FIG. 10(c) is a frame from FIG. 10(b) after centroid determination for each cluster. FIG. 10(d) is the image of the slit obtained from summing 10,000 such frames of data.

DETAILED DESCRIPTION OF THE INVENTION

Figure 1:
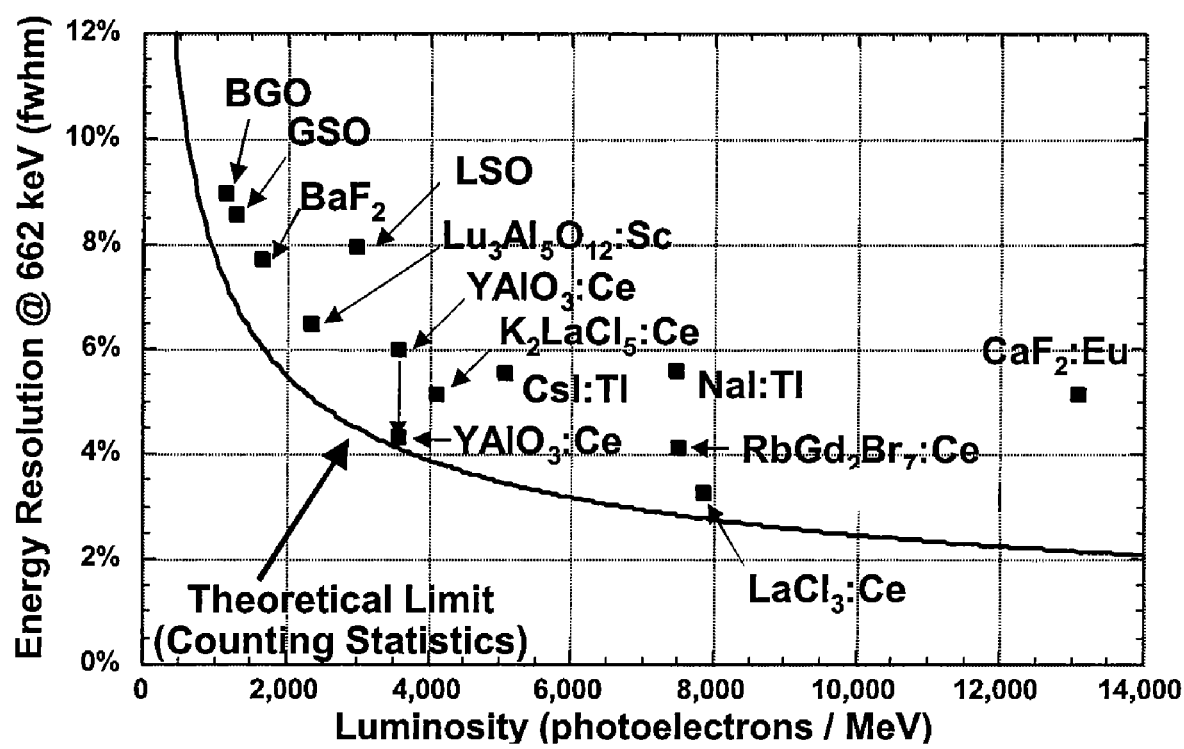
FIG. 1 depicts the measured energy resolution of scintillators for 662 keV γ-rays as a function of their light output. The solid curve indicates the theoretical lower limit placed by counting statistics.
Figure 2:
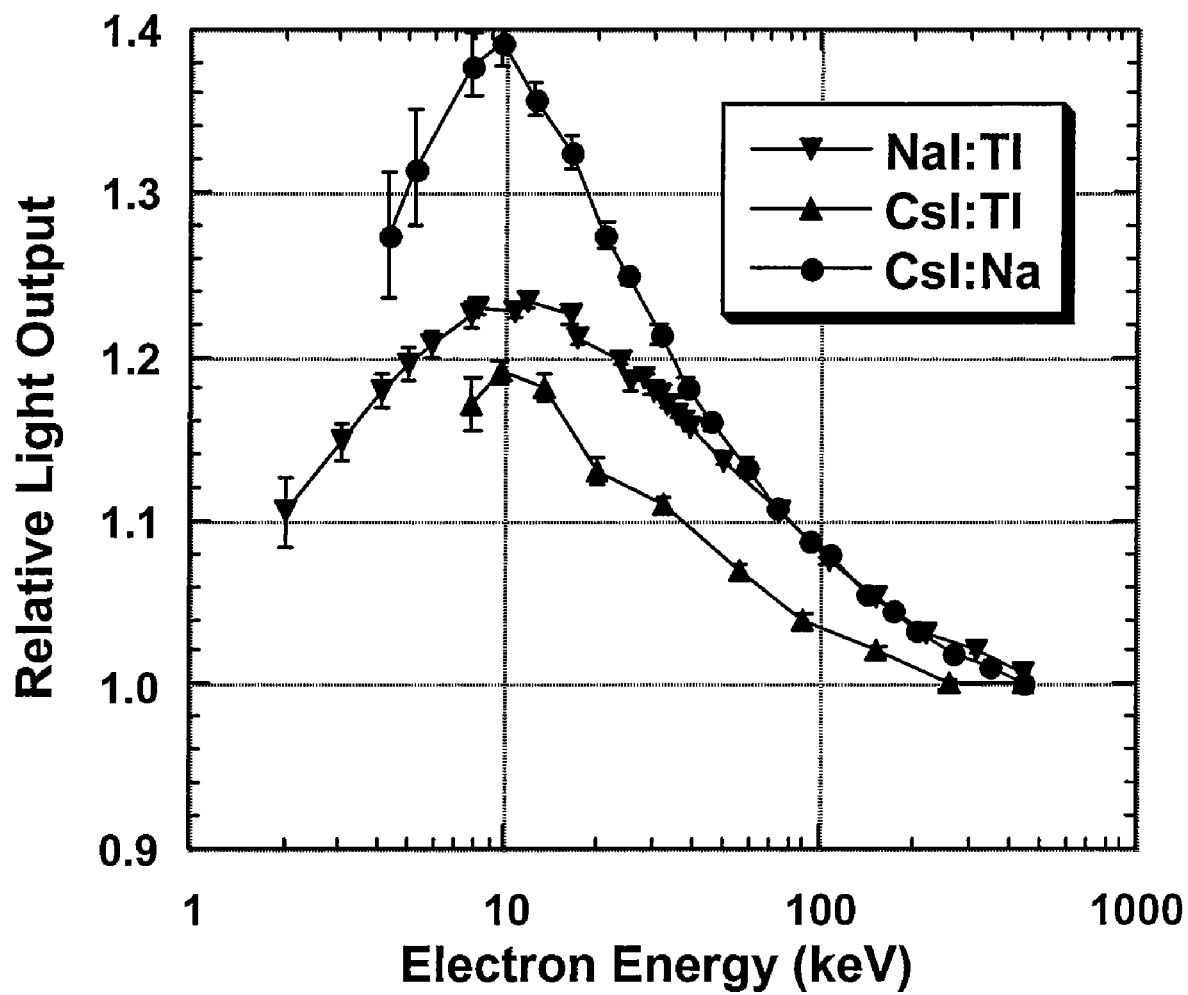
FIG. 2 depicts the electron energy response (relative light output, normalized to the value at 662 keV versus electron energy) for alkali halides. Ideally, the response should be flat, that is, independent of the electron energy.

Disclosed herein are compositions and devices comprising a lanthanide halide ($LaHalide_3$) doped microcolumnar film, and methods for their production. The doped $LaHalide_3$ microcolumnar scintillators of the present invention comprise polycrystalline columns of doped $LaHalide_3$, whose structure results from well-controlled thermal vapor deposition of Lanthanide Halide and the dopant from independent sources. The disclosed method makes use of commercially available, low cost, salts of $LaHalide_3$ and dopant $Halide_3$ compositions as starting materials. The performance characteristics of such a scintillator can be tailored for the desired application by modifying deposition parameters, such as the evaporation rate, substrate temperature and deposition process pressure. Prior experience growing microcolumnar films of CsI:Tl has demonstrated that vapor deposition under the conditions of very high substrate temperature and low process pressure result in a transparent polycrystalline film. In addition, unlike crystal growth techniques, such as for example, melt techniques, physical deposition from a vapor is largely a function of the partial pressures of the constituents, opening the possibility of chemical compositions that are not achievable directly from the melt. Further, the specific problems associated with crystal growth of doped $LaHalide_3$ scintillators, such as for example, low growth rate (1 to 3 months), and low yields (resulting from crystal cracking and other difficulties) can be avoided. Furthermore, while growing large area single crystals becomes more difficult as the size increases, vapor deposition can be used to grow large area panels with minimal increases in complexity.

The microcolumnar doped lanthanide halide scintillator of the present invention convert incident x-ray/gamma-ray radiation into visible light with very high detection efficiency and high optical light signal per incident photon, resulting in excellent signal-to-noise (SNR) and contrast in the acquired image. The microcolumnar structure (controllable to column diameters of 10 to 30 μm) suppresses lateral light scattering by channeling the optical photons via total internal reflection to the readout sensor. Thus, a thick scintillator structure (about 100 μm to 3 mm or higher) can be grown to achieve high x-ray/gamma-ray absorption with minimal loss of spatial resolution, overcoming the traditional tradeoff between detection efficiency and spatial resolution. When coupled to a suitable readout sensor such as a CCD, very high resolution of about 50 μm or better can be obtained while maintaining high stopping power for the incident radiation.

Since scintillation light produced in the film of the present invention is omni directional, it channels in both directions along the column in which a scintillation occurs. To conserve the light channeling away from the detector end, an efficient reflector can be formed atop the film using thin film techniques (FIG. 3(a)), which increase the light collection efficiency by over 40%. In the embodiments where the film of the present invention is deposited on an opaque substrate, the substrate itself can be coated with a reflector prior to vapor deposition of the doped Lanthanide Halide to achieve improved light output. (FIG. 3(b)).

The features of the methods and microcolumnar doped Lanthanide Halide scintillators of the present invention include:

1) fabrication in hours, as compared to weeks or months needed for crystal growth;

2) fabrication by a practical technique that minimizes cost and eliminates the complications, difficulties and high costs of crystal growth and material pixilation thereafter;

3) fine intrinsic segmentation (about 10 to about 30 μm, or higher), to achieve high spatial resolution;

4) controllable thickness, from about 100 μm to over 3 mm;

5) high stopping power (high effective Z of about 45 for $LaBr_3$), to produce high detection efficiency;

6) low optical cross-talk, to minimize image smearing;

7) efficient light transfer to the readout sensor, to achieve high SNR; and 8) large area fabrication, using economical chemical vapor deposition techniques.

$LaHalide_3$ as used herein encompasses a lanthanide in combination with various halides, including, for example, chlorine, bromine, fluorine, or iodide. In addition to lanthanum (La), other lanthanide members can be used to make a microcolumnar doped $LaHalide_3$ scintillator film composition of the present invention. The lanthanides include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). Halides useful in embodiments of the present invention include, for example but not limitation, chlorine, bromine, fluorine, iodine, and the like.

The microcolumnar structured doped $LaHalide_3$ scintillator of the present invention converts incident x-rays/γ-rays into visible light with very high efficiency, while the columnar structure suppresses lateral light spread by channeling the optical photons via total internal reflection to the readout sensor. The thickness of the film can be tailored to provide high absorption efficiency, in particular embodiments of the invention, for 27 keV ($^{125}$I) to 140 keV ($^{99m}$Tc) γ-ray energies typically used in SPECT, with minimal degradation in spatial resolution.

The microcolumnar $LaHalide_3$ scintillator compositions of the present invention typically include a "dopant". The dopant can effect certain properties, such as physical properties (e.g., brittleness, and the like) as well as scintillation properties (e.g., luminescence, and the like), of the scintillator composition. The dopant can include, for example, cerium (Ce), praseodymium (Pr), or mixtures of cerium and praseodymium. Cerium is a particularly good dopant for use in the microcolumnar $LaHalide_3$ scintillator film compositions of the present invention because, for example, it imparts high luminescence efficiency, good timing resolution, and short decay time, as well as suitable physical properties (e.g., limited brittleness, and the like) to the scintillator composition of the present invention. A trivalent form of the dopant is typically employed, for example, $Ce^{3+}$ or $Pr^{3+}$, and is supplied in various forms, e.g., halides, such as cerium chloride or cerium bromide. Other dopants that can be used in the scintillator compositions of the invention include, for example, dysprosium (Dy), europium (Eu), samarium (Sm), strontium (Sr), thallium (Tl), chlorine (Cl), fluorine (F), iodine (I), and mixtures of the dopants.

The amount of dopant present will depend on various factors, such as the application for which the microcolumnar doped $LaHalide_3$ scintillator film composition is being used; the desired scintillation properties (e.g., emission properties, timing resolution, and the like); and the type of detection device into which the microcolumnar $LaHalide_3$ doped scintillator film is being incorporated. For example, the dopant typically is employed at a level in the range of about 0.1% to about 20%, by molar weight. In many embodiments, the amount of dopant is in the range of about 0.1% to nearly about 100%, or about 0.1% to about 5.0%, or about 5.0% to about 20%, by molar weight.

One embodiment of the present invention comprises an imaging scintillation radiation detector. The imaging scintillation detector comprises a doped $LaHalide_3$ microcolumnar scintillator formed or deposited on a substrate. The substrate can include compositions such as amorphous carbon, or can include glassy carbon, graphite, aluminum, sapphire, beryllium, boron nitrate, and the like. Additional examples include, for example, a fiber optic plate, prism, lens, scintillator, or photodetector. The substrate can be a detector device, or a portion or a surface thereof (e.g., an optical assembly, imaging photodetector, and the like). The substrate can be separate from a detector device and/or comprise a detector portion (e.g., a scintillator panel) that can be adapted or optically coupled to, or incorporated into, a detection device (e.g., an imaging photodetector) or assembly.

The substrate can be processed and/or modified prior to application of the scintillator film to the substrate surface. For example, a substrate surface can be processed in order to refine the substrate conformation, such as to even the substrate surface and remove projections/recesses present on the substrate surface. In some instances, for example, substrate processing can be performed in order to enhance scintillator adhesion. In some instances, such processing of a substrate surface can improve adhesion characteristics between the scintillator layer and the substrate, thereby preventing detachment or peeling of the doped microcolumnar scintillator film from the substrate surface. Non-limiting examples of processing include chemical etching, sandblasting, laser etching, laser patterning, cleaning (e.g., plasma cleaning procedures), and the like.

Typical embodiments of the present invention provide for a surface coating for the microcolumnar scintillator and/or the substrate. Surface coatings as used in the present invention can be opaque or can be optically transparent. The surface coating can be added post deposition of the scintillator film on the substrate or can be added to the substrate prior to depositing the doped microcolumnar $LaHalide_3$ scintillator film. The purpose of the coatings is two-fold. First, it can protect the film from atmospheric moisture and mechanical damage during normal handling, and second, it can enhance the light collection efficiency of the scintillator film screen using a reflective layer, as described further below. It should be noted, that when the scintillator side, or $LaHalide_3$ side, of the scintillator/substrate assembly is coupled to a readout sensor, the protective coating has to be optically transparent and the reflective coating is fabricated on the substrate. Conversely, when the scintillator films are deposited on for example, a fiberoptic faceplate, the reflective coating may be applied on the scintillator film top surface.

Formation of such coatings atop the doped microcolumnar $LaHalide_3$ film can be performed in-situ during the vapor deposition process, i.e., without breaking the vacuum. However, this requires an evaporator equipped with a source of protective and/or reflective materials. An alternate embodiment is to design a specialized substrate holder with, for example, a spring-loaded window. The window will remain open during the $LaHalide_3$ dopant deposition on the substrate and can be closed after the deposition using, for example, a mechanical trigger located outside the evaporation chamber. The closed substrate holder is then filled, for example, with dry $N_2$, which is typically used to purge the vacuum. The substrate holder can then be quickly transferred to a dry chamber. The same substrate holder can be used in other evaporation systems that are used to produce reflective and protective coatings.

An optically transparent protective hard coat of, for example, but not limitation, titanium oxide and aluminum oxide can be formed using a plasma enhanced, ion assisted, high density deposition process. It is anticipated that in the case of titanium (Ti) coating, a thin layer of $TiO_2$ can be formed at the Ti-air interface as well as at the Ti-doped LaHalide$_3$ scintillator interface. This, however, should not affect the performance of the scintillator or alter properties of the coating in any significant way. During the vapor deposition process, substrates can be maintained at room temperature to prevent damage to the scintillator film. The hard coat layer thickness may vary between about 100 nm to about 1 µm.

In certain embodiments of the present invention, a protective resin layer is added. As one example, parylene (a vapor deposited and polymerized layer of para-xylylene, or its substituted derivatives) coating is used as an optically transparent hermetic sealing and protective layer on the microcolumnar doped LaHalide$_3$ film. Parylene has a very low density and low atomic number, so the incident x-ray/γ-ray flux is not appreciably attenuated in this coating. Various para-xylylene polymer compositions are known and include, for example, compositions known by the trade name "parylene" including, for example, poly-para-xylylene (tradename "PARYLENE N", such as available from Paratronix, Inc. Attleboro, Mass.), polyvinylidene chlorides (e.g., saran resins or films), and epoxy polymers. Other organic polymers, including those commonly used as conformational coatings, will be suitable for use as a resin coating according to the present invention. Typically, an approximately 5 µm thick coating is formed by vapor deposition, which is expected to provide adequate hermetic sealing.

Since the scintillation light produced in the microcolumnar film is omni directional, it channels in both directions along the column. To collect the light channeling away from the detector end, an efficient reflector can be formed atop the film using thin film techniques. In one embodiment of the present invention, the addition of a reflecting layer can increase the light collection efficiency by over 40%. In the case of films deposited on an opaque substrate, the substrate itself can be coated with a reflector prior to vapor deposition of the LaHalide$_3$:Ce to achieve improved light output.

Thus, following deposition, the scintillator layer can be coated with an additional layer, such as an optically absorptive or reflective layer ("optical layer"). In certain embodiments of the present invention, the additional layer is opaque. An optical layer of the present invention typically includes inorganic materials, such as metals, and the like. A light absorptive layer may be useful, for example, for absorbing light which might otherwise degrade resolution. A light-reflective can also be used, e.g., to reflect incident light back into a deposited scintillator so that a greater portion of the light exits the scintillator material at a desired alternative location, which can increase the detected signal, thereby improving signal-to-noise ratios. The additional layer can also act as a protective layer for the scintillator film of the present invention. The protective layer can be a separate layer from the optical or reflective layer; the optical or reflective layer can also act as a protective layer.

Therefore, in one embodiment, the resin layer or scintillator layer (e.g., a doped microcolumnar LaHalide$_3$ film layer) can be coated with a reflective layer(s), such as an inorganic material, $Al_2O_3$, aluminum, white paint, and the like, and/or a moisture protective barrier, such as, for example, silicon monoxide (SiO), silicon nitride ($Si_3N_4$), zirconium oxide (ZrO), silicon dioxide ($SiO_2$), and the like. To achieve a highly reflective coat, 250 µm thick, three and one half to five and one half bi-layers of SiO and $Si_3N_4$ ($n_{SiO}$=1.4 and $n_{Si3N4}$=1.6 to 2.1) can be formed. The order and thickness of each of these layers can be tailored to alter reflection/transmission properties of the coatings. These can be formed, for example, using a plasma enhanced chemical vapor deposition (PECVD) technique. As such, a certain embodiment of the present invention the optical layer can comprise at least one coating of a reflective material and at least one coating of a protective material.

As set forth above, the substrate can be separate from a photodetector device and/or comprise a photodetector portion. The scintillator panel can be adapted or optically coupled to, or incorporated into a photodetection device or assembly. For example, the scintillator layer formed on the detector can be optically coupled to one or more photodetectors. Non-limiting examples of photodetectors include photomultiplier tubes (PMT), photodiodes, charge coupled device (CCD) sensors, image intensifiers, and the like. Choice of a particular photodetector, or integrating a radiation detector (e.g., a scintillator panel) into a detector assembly are known in the art and need not be described in detail here. For non-limiting examples of techniques for operably coupling a detector containing a scintillator to a photodetector or detector assembly see, e.g., U.S. Pat. No. 5,171,996 and U.S. Pat. No. 6,468,305. See also, commonly owned U.S. patent application Ser. No. 11/158,938, which is incorporated herein by reference.

The ruggedness and high x-ray absorption power per unit length of such a scintillator and the ability to produce large area imaging screens will allow a microcolumnar signal converter to be used in a wide variety of commercial systems. For example, a commercial CCD imaging system integrated with the novel microcolumnar scintillator in a digital modality, which lends itself to image processing and display enhancements of the data.

Two issues to consider with the use of a doped LaHalide$_3$ microcolumnar scintillator for use in a detector are that 1) it is hygroscopic and, 2) it has self activity which creates a background radiation. The issue of the hygroscopic nature of the halides is addressed in the present compositions either by in-situ deposition of a protective layer or by designing a special mechanical assembly to transfer the vapor deposited films to a dry ambient atmosphere for further processing. Further processing can include providing a hermetic sealant or incorporation of the scintillator into a hermetically sealed device. As regards to the background radiation in a doped LaHalide$_3$ microcolumnar scintillator, it is found to be between about 0.8 and about 14 Bq/cc depending on the batch of raw material used. A radiation value in this range is low compared to the expected photon count rates that are typical in SPECT imaging. Furthermore, since the majority of this background radiation is in the range of 1.5 to 2.8 MeV, a relatively thin doped LaHalide$_3$ microcolumnar film used in the detectors of the present invention will not detect it. In addition, energy discrimination will help in minimizing the influence of the background on the true data.

Using the methods described herein a particular embodiment of the present invention comprising a microcolumnar LaCl$_3$:Ce film on a fiberoptic face plate. Films of up to 500 µm have been obtained and although the process is un-optimized, the films obtained show the promise of the disclosed vapor deposition technique for fabricating a low-cost, high-resolution, high-efficiency, microcolumnar LaCl$_3$:Ce imaging scintillation radiation detector.

In a further embodiment of the present invention microcolumnar LaBr$_3$:Ce films have also been deposited on a graphite substrate using the methods of the present invention. Although the process is un-optimized, the films obtained show the promise of the proposed vapor deposition technique for fabricating a low-cost, high-resolution, high-efficiency, microcolumnar LaBr$_3$:Ce imaging scintillation radiation detector.

Figure 3A:
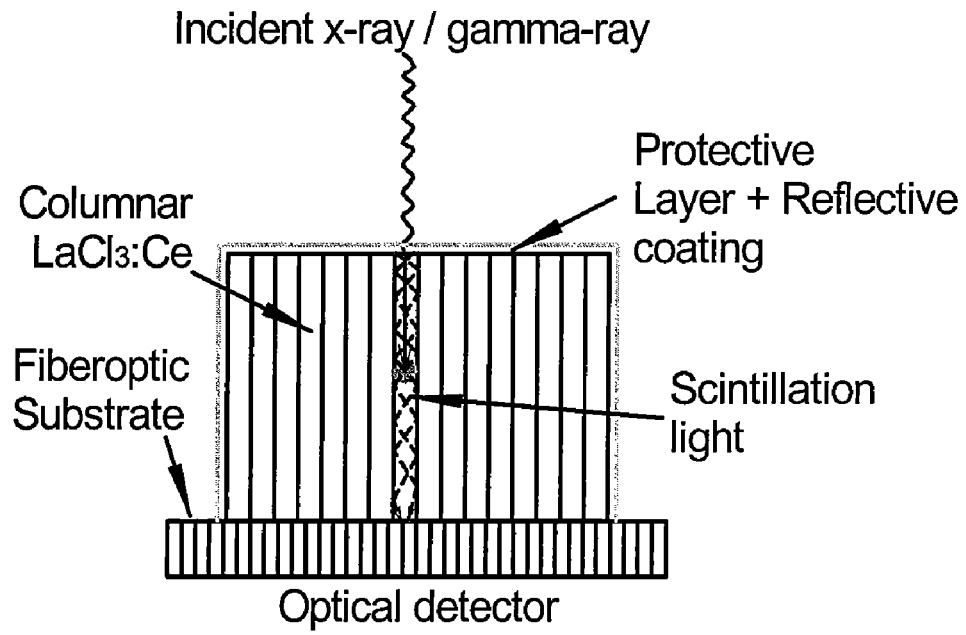
FIGS. 3(a) and 3(b) depict schematics of doped microcolumnar $LaHalide_3$ scintillator structures.
Figure 3B:
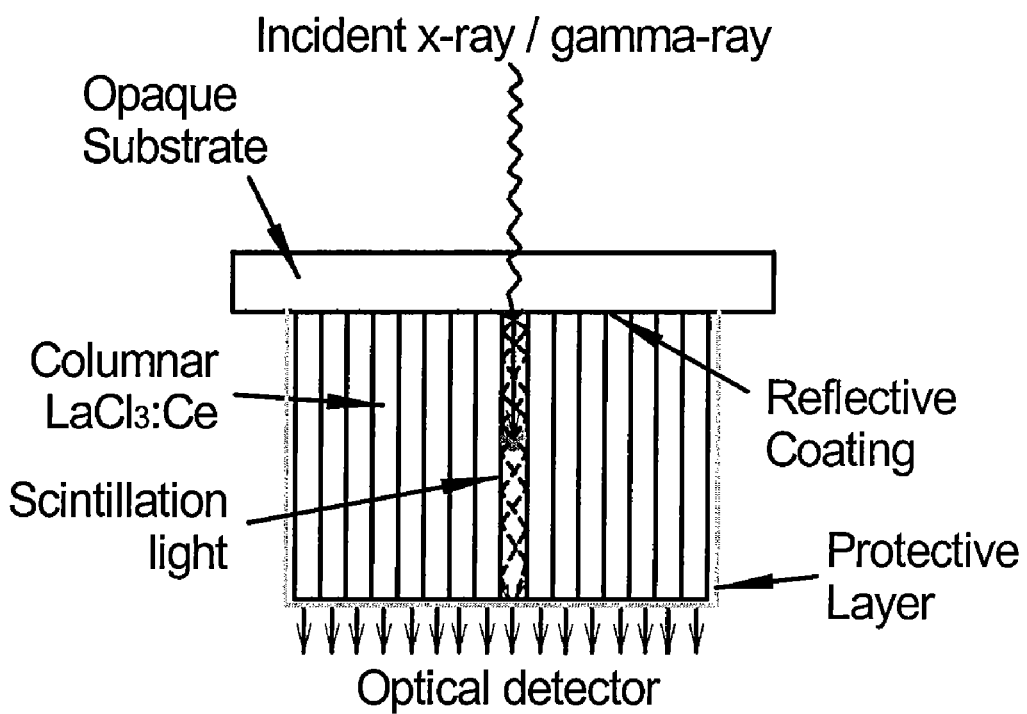

A microcolumnar scintillation radiation detector of the present invention comprises polycrystalline columns of doped LaHalide$_3$ whose structure results from a well controlled thermal vapor deposition of LaHalide$_3$ and a halide dopant, such as CeHalide$_3$, starting materials from independent sources onto a suitable substrate. A schematic of this microcolumnar structure as part of a photon detector is shown in FIGS. 3(a) and 3(b). The performance characteristics of such a scintillator based detector can be tailored for the desired application by modifying the deposition parameters such as the evaporation rate, the substrate temperature, the process pressure, and the like. The formation and structure of the microcolumns can be controlled by, for example, the rate of deposition and by controlling the temperature of the substrate. In addition to being an economical process, thermal vapor deposition allows fabrication of large area films, which are ready for immediate use.

Microcolumnar Doped LaHalide$_3$ Film Deposition:

LaHalide$_3$:Ce, as described above, is a recently developed doped lanthanum halide crystal scintillator material which because of its excellent scintillation properties offers many advantages for SPECT, gamma camera designs, and for other medical imaging applications. Additionally, due to its lower melting point and the cubic nature of its crystal structure can be grown into a microcolumnar form using conventional vapor deposition techniques. While vapor deposition of LaHalide$_3$:Ce films using crystalline LaHalideide$_3$:Ce material was considered to be possible, it posed two difficulties. First, due to the variations in the respective vapor pressures during high vacuum deposition ($10^{-6}$ Torr), maintaining proper proportion of LaHalideide$_3$ and Ce dopant in the resulting film could be difficult, and second, the crystalline material was expensive which made it a less attractive choice for deposition. In the methods of the present invention salts of LaHalide$_3$ and CeHalide$_3$ were co-evaporated from separate sources to form the desired columnar structure. The use of commercially available salts simplifies the fabrication process since an elaborate and expensive process of crystal growth is completely avoided. This effectively reduces the cost of the resulting scintillator and provides control over the chemical composition of the resulting film.

Fabricating microcolumnar films of doped LaHalide$_3$ required modification of typical evaporation hardware used for making films of other scintillator materials because of the hygroscopic properties of the halides and the difference in the melting and vaporization temperatures of the starting materials. Specifically, in a particular embodiment of the present invention the source boats needed to co-deposit the LaHalide$_3$ and CeHalide$_3$ as the dopant needed adequate power for rapid and controlled melting of these salts without excessive spilling. For the desired microcolumnar growth the boat temperatures should be between 1.3 to 1.5 times the melting temperature of the starting material. Since the vapor pressures of these compounds are significantly different at low pressures, deposition rate monitoring plays an important role in controlling the dopant concentration in the resulting film, and hence its scintillation properties. Also, due to the proximity of the source boat and the film substrate, the substrate temperature was modulated. In certain embodiments of the invention the substrate temperature may be maintained at about 70% to about 80% of the material melting point. Thus, an active temperature control system was needed to modulate the substrate temperature and could be needed to shield the film substrate from the source boat heat. This temperature achieves the preferred deposition rate of about 15 microns/min, compared with about 3.5 microns/min for CsI.

In order to protect the starting materials and the finished doped microcolumnar LaHalide scintillation radiation detector of the invention from moisture, the starting materials are kept dry, the vapor deposition is maintained dry during the deposition process and the finished doped microcolumnar scintillation radiation detector is kept free of moisture until either a hermetic sealant is added or the detector is incorporated into a hermetically sealed device. In one particular embodiment of the invention, the starting materials were sealed prior to deposition and handled in a dry box. Further, the source boats were designed to have a mechanism to seal the source during transportation from the dry box to the evaporator. Further, a mechanism was needed for in situ sealing of the finished films. In one embodiment of the process a substrate holder was designed with the capability to seal the films after evaporation. One embodiment of the mechanism could be remotely activated prior to ambient exposure. In another embodiment of the invention, the film was sealed in situ by evaporation of a hermetic sealing material.

The methods of the present invention for producing a microcolumnar doped LaHalide$_3$ scintillator film on a substrate to form an imaging scintillation radiation detector comprises the steps of placing a substrate in an evacuatable chamber; creating a high-vacuum ($10^{-6}$ Torr) in the chamber; and co-evaporating a salt of a lanthanum halide and a salt of a dopant halide in the chamber. In a particular embodiment, the lanthanum halide and the dopant halide starting materials can be evaporated from different containers, or source boats. In addition, as above, a means for actively controlling the substrate temperature can be provided to, for example, keep the substrate from acquiring heat from the source boats.

As set forth above, scintillator compositions of the present invention may find use in a wide variety of applications. In one embodiment, for example, the invention is directed to a method for detecting energetic radiation (e.g., gamma-rays, X-rays, etc.), emitted from a radiation source, with a scintillation detector including the scintillation composition of the invention. Scintillator compositions of the present invention can be included in radiation detection devices and assemblies that typically will include a scintillator optically coupled to photodetector assembly. The detector device can include a computer control or data analysis system to process and/or transmit information from other components of the system, including the photodetector assembly.

A system (e.g., computer control or data analysis system) can include, for example, a module or system to process information (e.g., radiation detection information) from the detector/photodetector assembly and can include a wide variety of proprietary or commercially available computers or systems having one or more processing structures, a personal computer, mainframe, or the like, with such systems often comprising data processing hardware and/or software configured to implement any one (or combination of) the method steps described herein. Any software will typically comprise machine readable code of programming instructions embodied in a tangible media such as a memory, a digital or optical recording media, optical, electrical, or wireless telemetry signals, or the like, and one or more of these structures may also be used to transmit data and information between components of the system in any of a wide variety of distributed or centralized signal processing architectures.

In summary, the thick film, vapor deposition, scintillator crystal panels offer significant advantages and unique capabilities over detectors obtained from crystal growth.

EXAMPLE

The goal of this example was to demonstrate the feasibility of fabricating microcolumnar $LaBr_3$:Ce scintillator films by the co-evaporation of $LaBr_3$ and $CeBr_3$ onto a suitable substrate, and to establish their usefulness for small animal SPECT/CT imaging. This example was designed to focus on fabricating approximately 250 μm to 500 μm thick films, with column diameters ranging from 2 μm to 20 μm, on a 5×5 $cm^2$ substrate; to show that these films can scintillate and that the films possess similar excellent properties of their melt-grown crystal counterparts; and render beneficial effects in achieving high spatial resolution of 10 lp/mm or higher for radiographic and small animal SPECT imaging. The example also examined methods to protect the material from atmospheric moisture before and after vapor deposition was conducted. Preliminary characterization of the films was also performed.

The microcolumnar scintillator films were characterized to demonstrate high scintillation light yield and fast decay time with minimal afterglow. The films of the invention were analyzed by incorporating $LaBr_3$:Ce films into a CCD system to demonstrate at least 5 lp/mm spatial resolution and high quality radiographic imaging. In addition, single photon γ-ray imaging was performed by coupling $LaBr_3$:Ce films to a suitable readout such as an EMCCD or an APD, and using $^{125}I$ (27.5 keV γ-rays) and $^{99m}Tc$ (140 keV γ-rays) sources to demonstrate flood field uniformity of ±10% and an intrinsic spatial resolution equivalent to the $LaBr_3$:Ce film resolution in X-ray mode (~100 μm or 5 lp/mm). The results obtained demonstrate the feasibility of the compositions and methods of the invention to synthesize a $LaBr_3$:Ce scintillator for production in large-area high-resolution formats, in a cost effective manner.

The deposition of multicomponent microcolumnar films of $LaBr_3$:Ce using $LaBr_3$ and $CeBr_3$ as separate sources, under controlled and reproducible conditions, had never been achieved before, and was made possible by the relatively low melting points of its constituents. One difficulty in preparing the microcolumnar films was the large variation in vapor pressures of $LaBr_3$ and $CeBr_3$ at the process pressure ($10^{-6}$ Torr). The difference made it difficult to maintain the proper proportion of $LaBr_3$ and Ce dopant in the resulting films. The use of a crystalline $LaBr_3$:Ce as a single source for evaporation did not help, because the Ce would evaporate prior to the $LaBr_3$, depleting most of the films from the main activator ions. Additionally, the hygroscopic nature of the constituents and the resulting $LaBr_3$:Ce films made it difficult to load and unload the evaporation system and special equipment had to be developed and implemented for material transport under dry conditions. Finally, $LaBr_3$:Ce is a highly corrosive material which contaminates the entire system and was found to be extremely difficult to remove completely once the evaporation run was completed. Although the system looked clean, the physically unseen remnants adsorb atmospheric moisture and make it very difficult to pump the system down to $10^{-6}$ Torr. As such, system cleaning was extremely time consuming not only because the evaporation chamber had to be cleaned, but also the vacuum pumps needed cleaning and re-generation before restoring their normal operation.

Subsequent evaporations used a systems with a shielding means implemented surrounding the source and substrate assembly, which minimized system contamination by effectively controlling vapor leaks to the other system parts and efficiently collecting direct spillage of the material from the boat during melting cycle. The temperature imbalance resulting from the shielding affected the film growth process, and was experimentally corrected to produce high quality films.

To minimize vacuum system contamination additional cold traps were installed in the path which effectively captured the $LaBr_3$:Ce vapors, preventing them from reaching the sensitive pumps. As a precaution the cryogenic pump attached to the system was regenerated twice during the course of the experiments to maintain the efficiency of its operation. To control evaporation rates, in-situ thickness monitors were introduced into the system. The monitors were strategically located within the chamber to view each boat separately. Further isolation was accomplished by using a shielding means, which restricted cross-contamination.

Raw materials needed for vapor depositions were kept in a dry box and transported to the evaporation chamber under a dry nitrogen atmosphere. A special showerhead attached to the dry nitrogen cylinder was manufactured. The materials were transferred into compartments permanently attached to the showerhead inside the dry box and transported to the chamber with a continuous nitrogen flow. To transport the evaporated films back to the dry box for hermetic sealing a special substrate holder was designed. This holder is an airtight enclosure with a spring-loaded door. The substrates are mounted inside the holder, which is then placed on the evaporator planetary system. The door remains open during deposition, but is closed from outside the chamber prior to leaking the system with dry nitrogen via a mechanical feed-through attached to the system.

Two different modes for distributing the starting material among the thermal sources described above were used in the present methods. The first configuration utilized $LaBr_3$ and $CeBr_3$ purchased from commercial vendors, while the second utilized only one source with crystalline $LaBr_3$:Ce (Saint-Gobain Crystals and Detectors, Ohio). The crystalline $LaBr_3$:Ce was in the form of several small pieces left over from packaging of the commercial grade BrilLanCe™ 380 crystals. While both configurations outlined above were able to produce excellent columnar films, it was found that the first approach consistently produced films with the highest conversion efficiency. Consequently, this method was used for further deposition of thick films in the range of 60 μm to 500 μm.

Fiberoptic substrates were used initially, although they attenuate light during transit from the scintillator to the underlying photodetector. However, fiberoptic substrates provided a relatively easy way to encapsulate films after deposition through the use of a prefabricated aluminum cap. The cap was machined using an appropriately sized piece of aluminum to form a step whose depth was slightly higher than the thickness of the fiberoptic substrate plus the $LaBr_3$:Ce film atop. The thickness of the aluminum window through which the incident radiation would enter the film was kept at ~10 mil (400 μm) thickness to minimize γ-ray/X-ray attenuation. After deposition the films were placed inside the aluminum cap and sealed using a commercial hermetic sealant. This operation was performed inside the dry box to minimize exposure to moisture.

In addition to the fiberoptic substrates, graphite substrates were also included in the evaporation runs and were primarily used to study the film morphology. Graphite substrates, are important as they are relatively inexpensive, only minimally attenuate incident X-rays and γ-rays, and their black surface minimizes optical scatter at the $LaBr_3$:Ce-carbon interface, thereby improving the spatial resolution of the film.

Several experiments were conducted to determine a set of process parameters that would produce microcolumnar structures. Specifically, the process pressure, the rate of deposition, the speed of rotation of the substrates, and the substrate angle relative to the direction of the evaporated material to control the resulting film morphology were adjusted. As expected, substrate temperature significantly influenced the film morphology, whereas the other parameters controlled its scintillation properties.

Figure 4A:
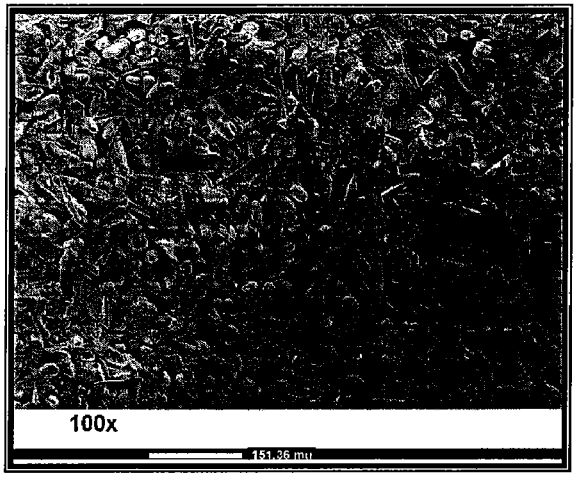
FIGS. 4(a) through 4(d) are SEM micrographs of microcolumnar $LaBr_3$:Ce films.
Figure 4B:
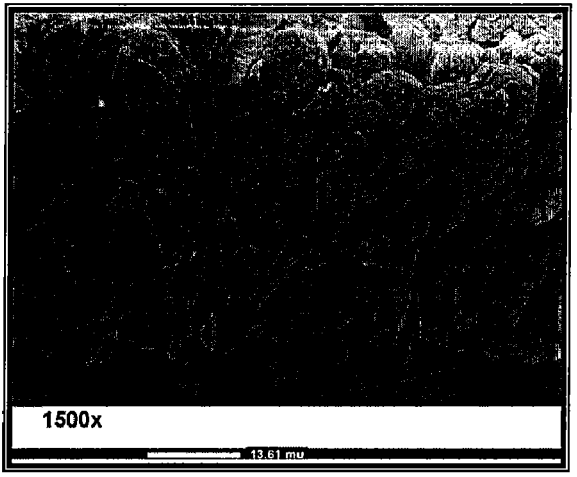
Figure 4C:
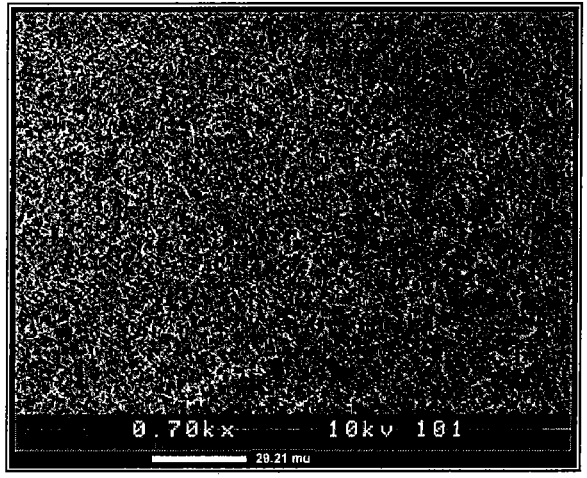
Figure 4D:
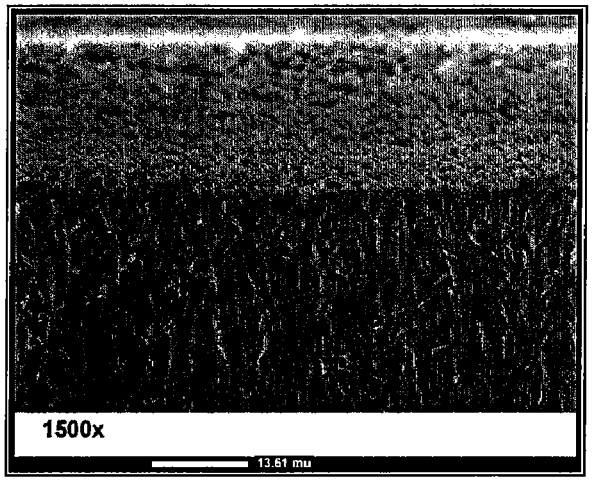

FIGS. 4(a) through 4(d) show the morphologies of the 180 μm and 225 μm thick films achieved during these experiments. FIG. 4(a) and FIG. 4(b) show the morphology of films deposited at a substrate temperature of 480° C. and FIG. 4(c) and FIG. 4(d) show the film structure when depositions were performed at a substrate temperature of 280° C. It should be pointed out that $LaBr_3$:Ce is a very malleable material and the process of breaking the film to prepare it for the SEM studies distorts the columns substantially, deviating them from their normal vertical orientation. The hygroscopic nature of $LaBr_3$:Ce further complicated the SEM characterization. SEM micrographs were obtained that show excellent columnar structure with co-evaporated $LaBr_3$:Ce. Deposition at higher substrate temperature results in wider columns than the films deposited at lower temperature, which show a fine, dendritic, structure. Growth of the film in columnar form was a significant accomplishment, considering the complexity involved in depositing $LaBr_3$:Ce from different sources, each with a markedly different vapor pressure.

During these initial experiments $LaBr_3$:Ce films on fiberoptic faceplates were fabricated up to ~5×5 cm$^2$, and up to about 500 μm thick. It should be noted, however, that the approximately 500 μm thick films produced were not included in the evaluations described below. The evaluations reported here were made using the approximately 200 μm thick $LaBr_3$:Ce films.

The first focus of this effort was to characterize the emission spectrum of co-evaporated $LaBr_3$:Ce films. These measurements were performed under steady-state excitation by 8-keV Cu $K_\alpha$ x-rays emitted from a Philips diffractometric source operated at 40 kV with 20 mA current. The resulting scintillation light was passed through a McPherson 0.2 m monochromator (model 234/302) that separated the light into its wavelength components, and the intensity of the selected wavelength was registered with an RCA C31034 photomultiplier tube (PMT). The entire operation of the instrument, including the x-ray trigger, the rotation of the monochromator to scan the wavelengths, and data acquisition and analysis, was computerized and automated.

Figure 5:
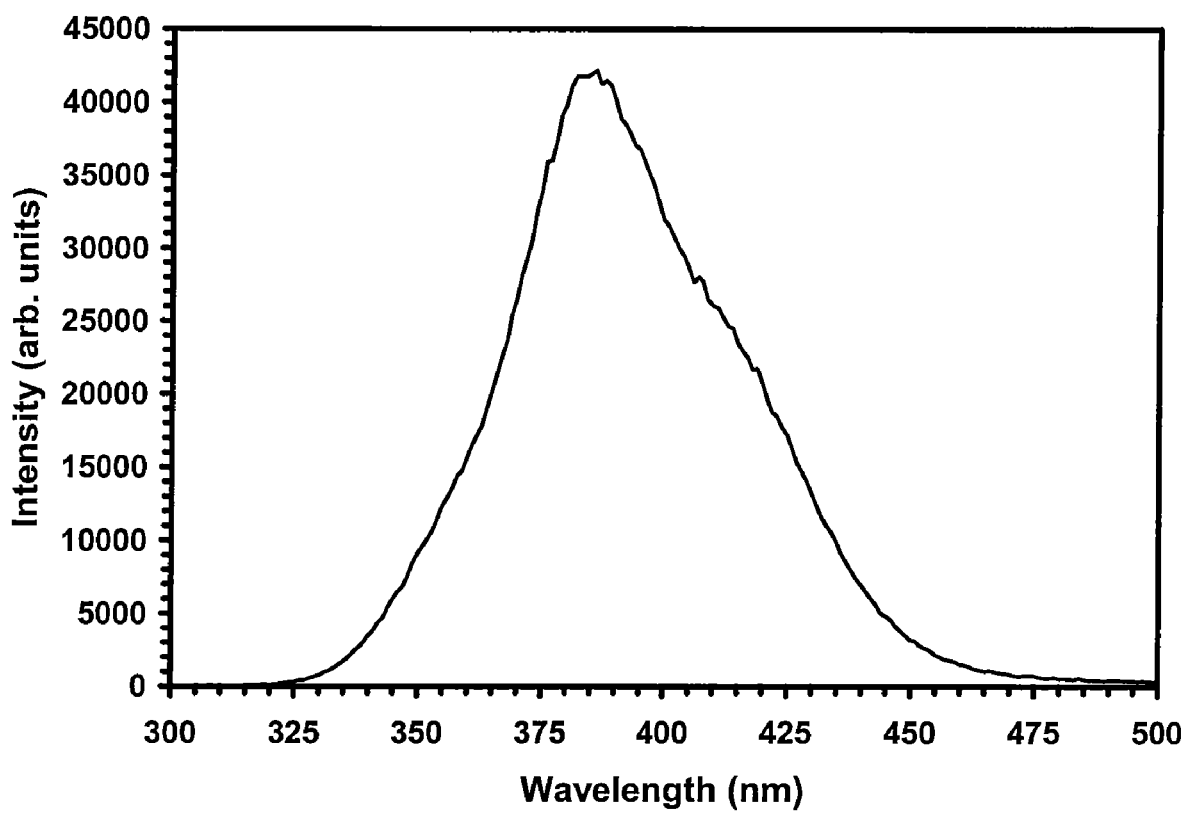
FIG. 5 depicts the measured emission spectrum of the vapor deposited $LaBr_3$:Ce film. The emission spectrum resembles that of the crystalline $LaBr_3$:Ce with its peak emission at 380 nm and a relatively broad emission in the 325 nm to 500 nm band.

As can be seen from FIG. 5, the emission spectra of the vapor-deposited $LaBr_3$:Ce films resembles that of the crystalline $LaBr_3$:Ce, with its peak emission at 380 nm and relatively broad emission in the 325 nm to 500 nm band. This was a significant result that demonstrated that the mechanism responsible for the luminescence in crystalline material operated in the same manner in films, and verifies the efficacy of growing efficient scintillators using vapor phase growth.

Figure 6A:
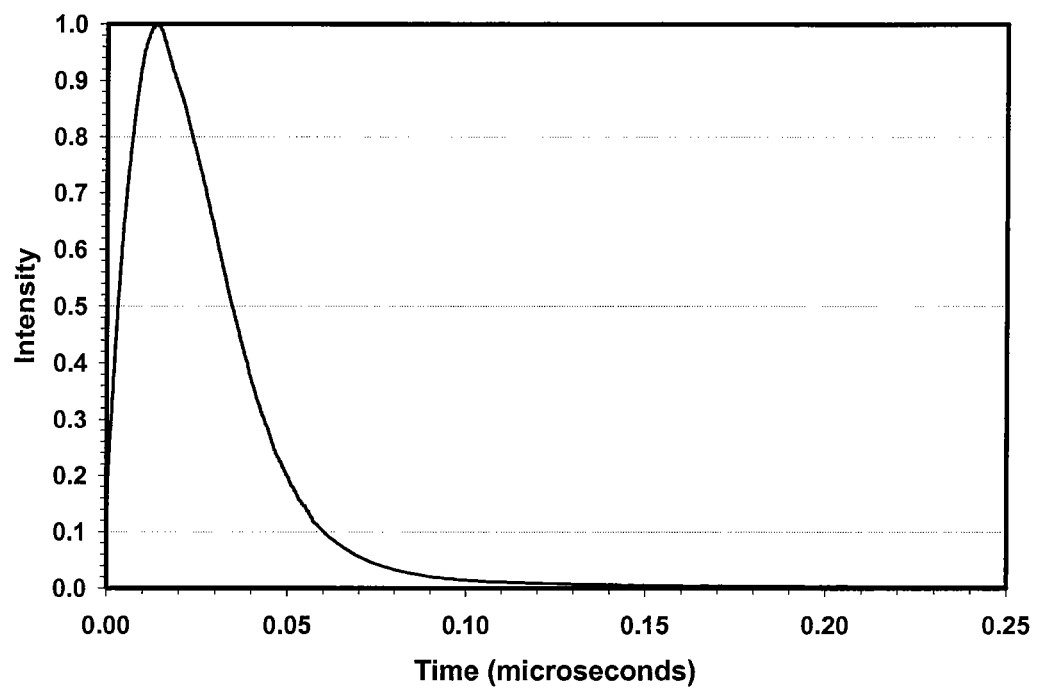
FIGS. 6(a) and 6(b) depict decay time and afterglow measurements of the $LaBr_3$:Ce film.

The most common method for measuring the decay pattern and afterglow is by means of short pulse excitation. In the present experiments, the specimens were excited by means of a Golden Engineering XRS-3 source, which provides x-ray pulses 20 ns FWHM with a nominal maximum photon energy of 250 kVp. The scintillation response from the specimens was passed through a 0.2-m McPherson monochromator, detected by a Hamamatsu R2059 photomultiplier, and recorded by a Tektronix TDS220 digital storage oscilloscope. The key to the success of the measurements lies in the wide range over which the system can be operated: Both time and signal domains span nine orders of magnitude (the former by scaling capability directly built into the scope, the latter by augmenting the built-in scaling through judicious selection of input impedance). The resultant decay trace is shown in FIG. 6(a). The measured decay time (1/e) of the $LaBr_3$:Ce films was on the order of 30 ns (FIG. 6(a)), which is consistent with the published data for crystals (16 ns-28 ns) (Del Guerra et al., IEEE Trans. Nucl. Sci. 47:1537, 2000). Also, the intensity dropped by well over 4 orders of magnitude in a mere few microseconds, showing the fastness of the scintillator. These data imply that the vapor deposition process does not introduce traps that slow down the decay process, and was a significant result demonstrating no adverse effect on the decay speed of the material due to the new synthesis process.

Figure 6B:
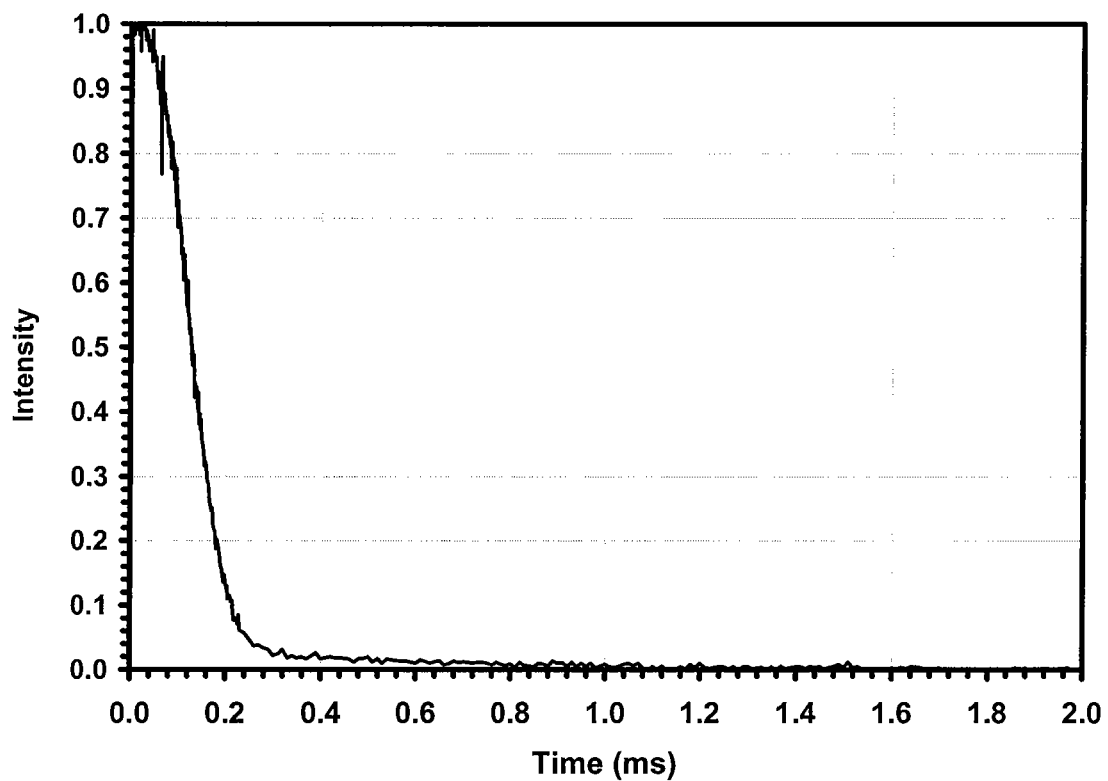

Since the magnitude of the afterglow depends strongly on the intensity and duration of the initial excitation, the decay characteristics was also measured after extended periods of excitation as well (100 kVp, 200 mAs). For this a special apparatus was set up consisting of a 60 kW Electromed CPX160 X-ray generator with a Varian rotating anode tube (model A292), capable of providing square pulses ranging in length from 1 ms to 8 s, over a similarly wide range of tube voltages and currents. The rise and fall times of the square pulses were specified as about 200 μs, and the scintillation signal was detected by a fast-response silicon PIN photodiode made by Hamamatsu, model S3204-8. This instrumentation gave the ability to measure decay traces under virtually any set of experimental conditions that might be relevant to real applications. FIG. 6(b) shows the afterglow data, demonstrating the absence of persistence in the films, making them useful for high speed and ultrahigh speed imaging applications. FIG. 6(b) shows the afterglow data, demonstrating the absence of persistence in the films, making them useful for high speed and ultrahigh speed imaging applications.

Four samples were used in further afterglow studies, including: (1) a $LaBr_3$:Ce film deposited at low substrate temperature using co-evaporation of $LaBr_3$ and $CeBr_3$; (2) a $LaBr_3$:Ce film deposited at high substrate temperature using co-evaporation of $LaBr_3$ and $CeBr_3$; (3) a $LaBr_3$:Ce film deposited at high substrate temperature using LaBr3:Ce crystal pieces as the starting material; and (4) an SGC 4×4×5 mm$^3$ B-380 crystal. The X-ray generator was set at 140 kVP, 0.5 mA, 2 sec., and the source-to-specimen distance was ~14". For these settings the estimated exposure was ~1 R, which is very high. The resulting data are listed in Table 3.

TABLE 3

Measured afterglow 20 ms after excitation with a 140 kVp, 0.5 mA, 2 sec pulse. Source-to-specimen distance was 14".

| Afterglow 20 ms after excitation | Comment |
|---|---|
| Several % | SGC Commercial B-380 crystal |
| 0.14% | high temp crystal evaporation |
| 0.29% | high temp co-evaporation |
| 0.36% | low temp co-evaporation |

As can be seen from the data, the vapor deposited films actually show an order of magnitude lower afterglow than the crystalline material, a rather surprising result, the reasons for which are not understood as yet. Among the films, those grown from the crystalline material supplied by Saint-Gobain (SGC) showed the best afterglow performance, followed by the film co-evaporated at high substrate temperature. This may be explained on the basis of the starting material purity and improved columnar structure at high deposition temperatures.

For measuring light output, signal-to-noise ratios, and the spatial resolution performance of scintillator screens a back-thinned, thermoelectrically cooled (−35° C.), 512×512 pixel electron-multiplying CCD (EMCCD) optically bonded to a 1:1 fiberoptic window was used (Nagarkar et al., *IEEE Trans. Nucl. Sci.* 53:54-58, 2006). The choice of using an EMCCD was partly based on its relatively high quantum efficiency for the 380 nm scintillation light of the $LaBr_3$:Ce source (see FIG. 9). Conventional CCDs are mostly insensitive in this region of the spectrum. With its pixel size of 16 µm, the camera has a Nyquist limiting frequency of 31 lp/mm and its effective imaging area is ~8.2×8.2 mm². Specially designed 3:1 and 6:1 fiberoptic tapers can be attached to the CCD window to achieve effective imaging areas of 24.5×24.5 mm² and 49×49 mm², respectively. The CCD device, readout electronics (including a 12 bit ADC), and image processing software operate on a PC platform.

The x-ray source for these measurements was a GE Senographe 600T-FD continuously adjustable x-ray generator with a Mo/Mo target/filter. For the measurements reported here, the x-ray generator was set at 28 kVp and the distance from source to detector was maintained at 45 cm. During each measurement the exposure was monitored using a Nuclear Associates Model 06-526-5280 RadCheck Exposure meter and the data were corrected for any variations in exposure. Measurements were made on a number of different $LaBr_3$:Ce films, but the following discussion focuses on two specimens, measuring 180 µm (high temperature deposition) and 225 µm (low temperature deposition) in thickness, that were ultimately used in imaging experiments.

Light output measurements were made by exposing the films to a uniform flood field of 28 kVp x-rays, and averaging analog-to-digital unit value (ADUs) in a pre-defined region of interest (ROI). For each measurement the x-ray exposure was 4 mR. Several measurements per screen were made to improve the statistical precision of the ADU value. These data were corrected for any variations in the measured X-ray exposure. The signal-to-noise ratio (SNR) in each screen was computed by dividing the average ADU value by the measured standard deviation in the flood image.

To estimate light yield from the $LaBr_3$:Ce films a calibrated CsI:Tl scintillator screen measuring approximately 200 µm in thickness was used. Light output measurements using both the screens were made under identical conditions and the $LaBr_3$:Ce data were rectified using the EMCCD Quantum Efficiency curve shown in FIG. 6 (Wagner and Brown, *Phys. Med. Biol.* 30:489-518, 1985) and the measured light from the CsI:Tl film. Initial $LaBr_3$:Ce films showed very low or no light yield. As the vapor deposition process evolved, films started to show improved light yield. The highest $LaBr_3$:Ce film light yield was approximately 2200 ADUs and that for the CsI:Tl films was 10,500 ADUs, measured under identical conditions. The EMCCD QE for 540 nm CsI:Tl emission was measured to be 92% and that for the 380 nm $LaBr_3$:Ce 38%. Thus, after the QE correction, the $LaBr_3$:Ce film light was estimated to be 5326 ADUs. Since microcolumnar CsI:Tl produces approximately 56,000 photons per MeV (Nagarkar et al., *IEEE Trans. Nucl. Sci.* 45:492-496, 1998) of light, the light yield of the $LaBr_3$:Ce films was estimated to be approximately 28,500 photons/MeV which is about 74% of the light yield of NaI:Tl.

The flood histogram demonstrates the response of the detector for a uniform field of x-rays or γ-rays. To measure the flood histogram, a 5×5 cm² $LaBr_3$:Ce film was coupled to the EMCCD via a 6:1 fiberoptic taper and the resulting detector was exposed to a uniform field of 28 kVp x-rays. As expected, the response was very uniform and light yield variations over the approximately 5×5 cm² film was found to be <1%. Since the CCD response was uniform, the data essentially reflected the uniformity of the $LaBr_3$:Ce film response to x-rays.

Figure 7:
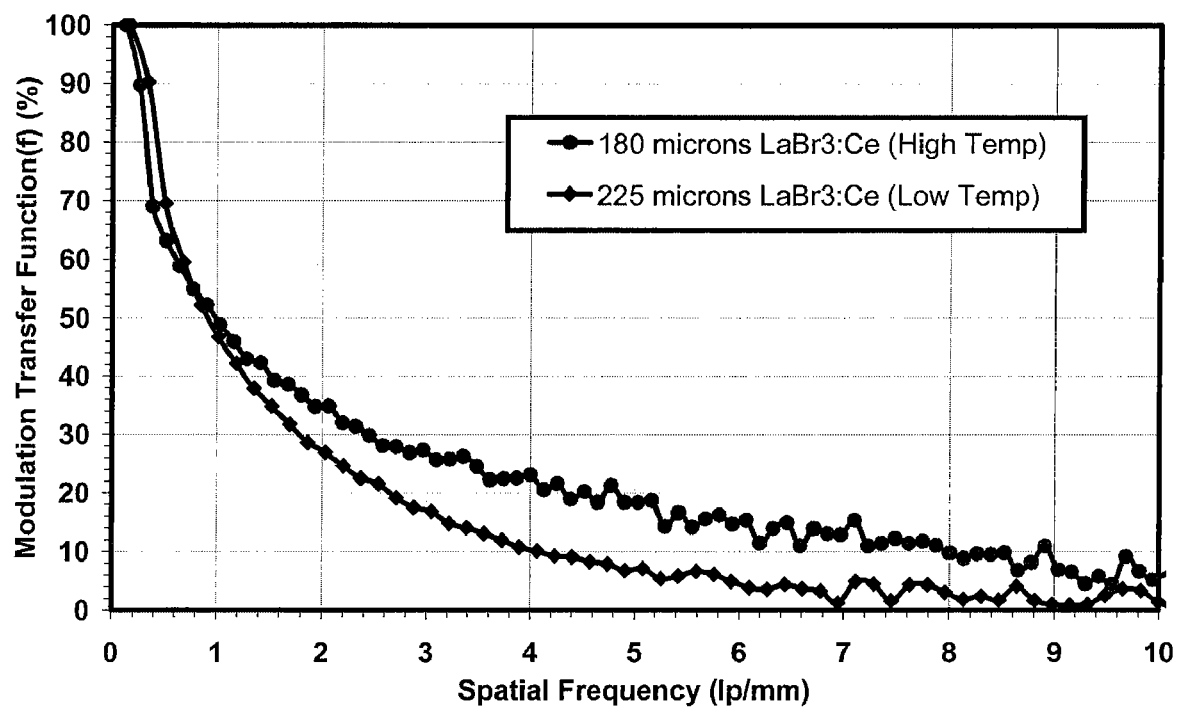
FIG. 7 depicts the spatial resolution of the $LaBr_3$:Ce films of the example. The approximately 200 μm thick films resolve spatial frequencies above 8 lp/mm. The difference in the observed MTF in the films was attributed to the structural differences arising from the difference in deposition temperature.

To evaluate the spatial resolution of the $LaBr_3$:Ce scintillator films, the pre-sampling MTF was measured according to the technique described by Fujita et al. (*IEEE Trans. Med. Imaging* M1-11:34-39, 1992) and others (Vedantham et al., *Med. Phys.* 27:558-567, 2000; Vedantham et al., *Med. Phys.* 27:1832-1840, 2000; Dobbins et al., *Med. Phys.* 22:1581-1593, 1995). An image of a 10 µm wide tantalum slit placed at a slight angle (less than one degree) to the CCD pixel matrix at the center of the detector was obtained. The slit was placed in contact with the surface of the imager so that the spreading of the Line Spread Function (LSF) due to the finite size of the focal spot would not pose a significant limitation. The exposure was adjusted by varying the current (mA) while maintaining a constant 28 kVp, to ensure that the tails of the resulting step function had no significant electronic noise. The finely sampled LSF was obtained and normalized to a peak value of unity. The Fourier Transform of the finely sampled LSF was performed to provide the pre-sampling MTF. FIG. 7 shows the measured MTF as a function of spatial frequency for 180 µm thick $LaBr_3$:Ce film deposited at high substrate temperature and 225 µm thick $LaBr_3$:Ce film deposited at low substrate temperature. As can be seen from the figure, although the film thicknesses are comparable, there was a substantial difference in the spatial resolution of the films. Specifically, the 10% MTF for the film deposited at low temperature was at only 4 lp/mm but that for the film deposited at high temperature was more than double, ~8.5 lp/mm. This difference was attributed to the structural difference in the film shown in FIG. 4, which demonstrated well-separated, fine columnar growth at higher substrate temperatures. Well-separated columns promote light channeling within the columns resulting in minimal spread in the horizontal direction and hence reduced veiling glare and improved image contrast.

The data shown here demonstrate the very high spatial resolution capability of the developed microcolumnar $LaBr_3$:Ce films. It should be noted that growth of $LaBr_3$:Ce films has shown excellent characteristics providing a unique combination of high efficiency and high spatial resolution. Further optimization in terms of process parameters will enable the growth of improved microcolumnar films of greater thickness to achieve even higher spatial resolution and higher light yield.

The DQE(f) of an imaging system represents its dose efficiency and has been shown to be highly predictive of the performance characteristics of the system (Vedantham et al., *Med. Phys.* 27:1832-1840, 2000). The DQE(f) of the EMCCD detector was measured using the 180 µm thick $LaBr_3$:Ce film deposited at high substrate temperature and the 225 µm thick $LaBr_3$:Ce film deposited at low substrate temperature. Since the EMCCD readout remained the same in both cases, measured DQE(f) reflects the system performance using the newly developed screens. The DQE(F) was calculated from the measured resolution (pre-sampling MTF (f)), the noise power spectrum ($NPS_{normalized}(f,\phi_x)$), and the photon fluence/exposure ($\phi_x$) of the incident X-ray spectrum, as described by Fujita et al. (*IEEE Trans. Med. Imaging* M1-11:34-39, 1992) and others (Vedantham et al., *Med. Phys.* 27:558-567, 2000; Vedantham et al., *Med. Phys.* 27:1832-1840, 2000; Dobbins et al., *Med. Phys.* 22:1581-1593, 1995). All measurements were performed at settings of 28 kVp and 30 mA, using the Mo/Mo x-ray source described earlier. By substituting these values, the DQE(f) of the system was calculated as:

$$DQE(f) = \frac{MTF^2(f)}{f_\chi \cdot NPS_{normalized}(f, f_\chi)}$$

Figure 8:
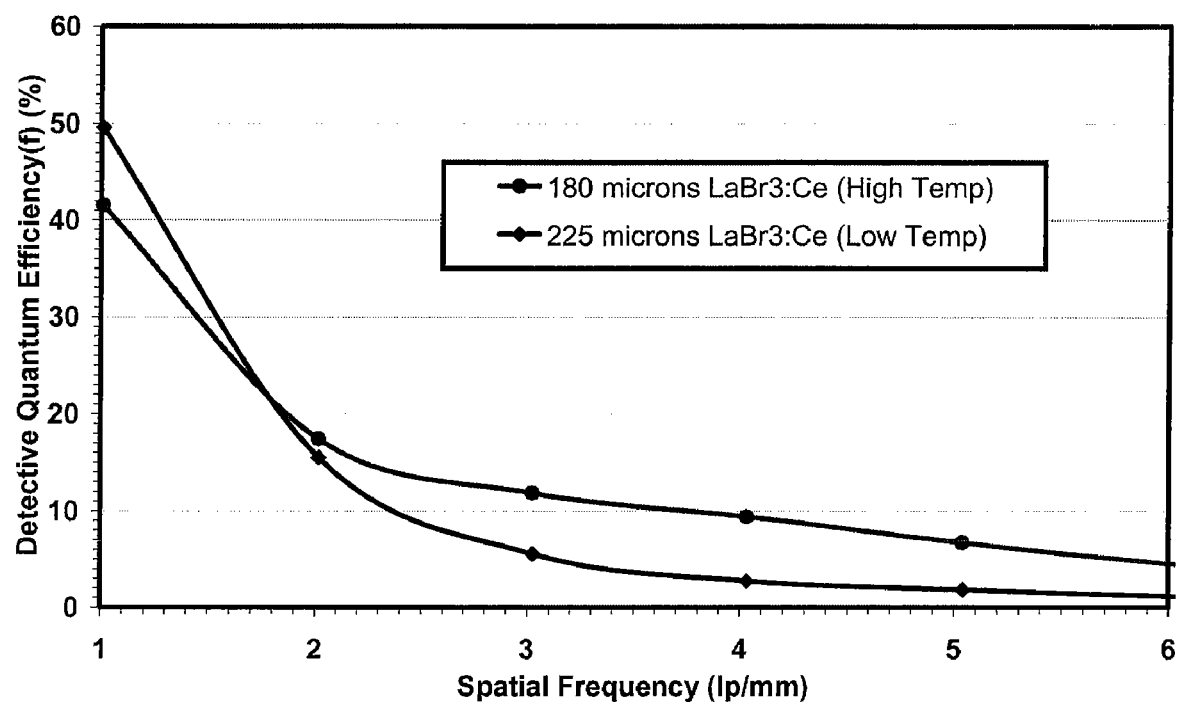
FIG. 8 depicts the measured DQE(f) of the EMCCD detector using the $LaBr_3$:Ce films from the example.

The resulting data are plotted in FIG. 8. As expected, the DQE(0) for the thicker 225 µm screen was higher than for the thinner 180 µm screen, and represents x-ray absorption efficiency which is related to the screen thickness. However, the high frequency DQE for the 225 µm thick LaBr$_3$:Ce film is significantly high. This gain is attributed to its superior spatial resolution (resulting from its well separated columnar structure), and will enable imaging of finer features in the object under test. As the DQE(F) depends on the signal strength, it is anticipated that it will improve significantly with the enhanced light yield expected from the next screens. Also, the thicker films will correspondingly enhance DQE(0) response.

Figure 9A:
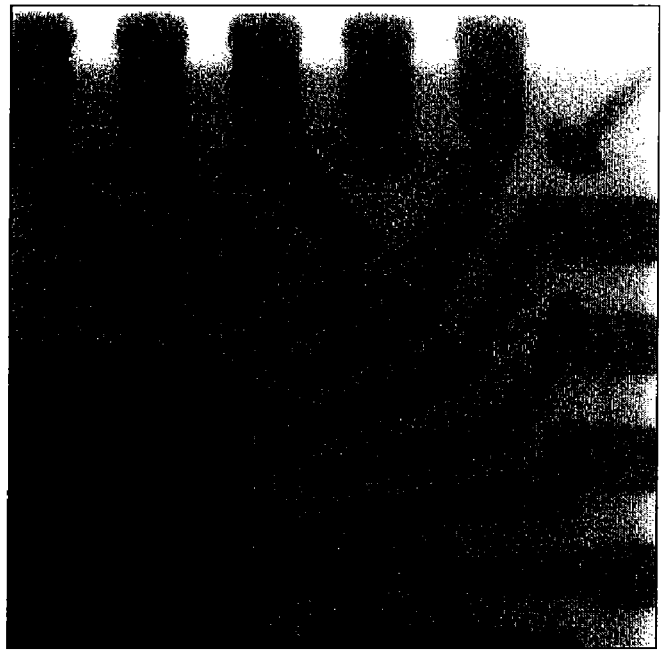
FIGS. 9(a) and 9(b) are radiographs of an integrated circuit (IC) chip with internal bond wires measuring about 25 μm in diameter.
Figure 9B:
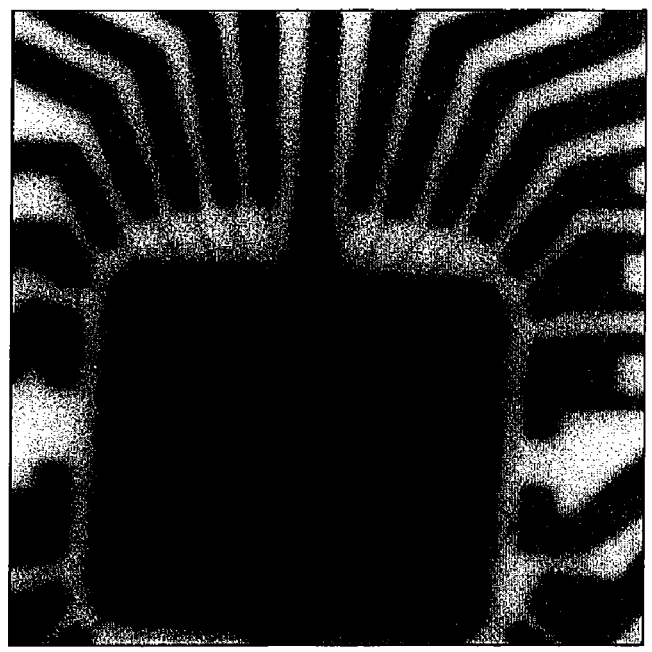

Radiographic imaging was performed by coupling both the 180 µm and the 225 µm thick LaBr$_3$:Ce films to the EMCCD, and operating the EMCCD in the 1:1 fiberoptic mode, which offers the best intrinsic detector resolution. While various objects were imaged, the radiographs in FIG. 9 show images of an integrated circuit (IC) chip with internal bond wires measuring ~25 µm in diameter. Clearly, both films resolve the 25 µm wires; however, the sharpness and contrast in the image obtained using the high temperature deposited film was superior to that obtained using the low temperature deposited film. Again, this was consistent with the observed film structure (FIG. 4) and the measured MTF(f) for these films (FIG. 7).

To evaluate the performance of the LaBr$_3$:Ce films for radionuclide imaging, samples selected on the basis of their performance were further evaluated. The 225 µm thick LaBr$_3$:Ce film was integrated into the Bazooka SPECT (Miller et al., *IEEE NSS/MIC Symposium*, San Diego, Oct. 29, 2006) small animal imaging system developed at the University of Arizona. Bazooka SPECT makes use of a front-illuminated CCD camera coupled to an image intensifier using commercial optics. The intensifier used in this system is a single-stage second-generation image intensifier (based on a microchannel plate) that has an S-25 photocathode and a P-43 output phosphor. Two back-to-back camera lenses (500 mm F1.2 & 400 mm F6.3) provide a minification of 8:1 and image the output phosphor on a 640×480 Dragonfly Express CCD detector from Point Grey Research. Despite the limited quantum efficiency of the S-25 photocathode, it has been demonstrated that this system performs well in low-light-level applications, because of the high gain (typically 20,000) of the front-end image intensifier. Essentially, photoelectron cascades initiated by single photoelectrons are independently detectable at the CCD, and light losses in the optics are nearly irrelevant to its performance.

The LaBr$_3$:Ce film was mounted on the fiberoptic window of the image intensifier using silicone optical grease. A 0.5 mm tungsten slit was placed in contact with the film and illuminated using 122 keV γ-rays from a 450 µCi $^{57}$Co source. The source-to-detector distance was varied until the count rate on the CCD was ~5 interactions per 30 ms frame. This rate was confirmed by radiometry calculation as a check. The clusters due to individual gamma-ray interactions were clearly visible against the random background of the intensifier screen (FIG. 10(a)). In all, 10,000 frames of data were acquired by operating the CCD at the rate of 30 frames per second (~30 ms/frame).

These data were further analyzed using the standard cluster detection algorithm previously developed to identify clusters arising from individual gamma-ray interactions (Miller et al., *Proc. SPIE* 6142, #65, 2006). First, a Gaussian smoothing was applied to each frame; second, contiguous pixels with signals above a threshold were identified to localize the clusters (FIG. 10(b)); finally, the centroid of each cluster was found and reported as a single pixel value (FIG. 10(c)). The reconstructed image of the slit obtained from these 10,000 frames of data is shown in FIG. 10(d).

The results of FIG. 10(d) verify that single gamma-ray detection and imaging are possible with columnar LaBr$_3$:Ce films—even those produced at this early stage of development. To our knowledge, this is only the second variety of columnar scintillator (together with CsI:Tl) to demonstrate a single gamma-ray imaging capability. Clearly, the light spread from each interaction is limited to only a few pixels, indicating the high resolution capability of the LaBr$_3$:Ce film. These data match well with the resolution data presented above.

It should also be noted that individual γ-ray image clusters vary in size as well as in brightness. This indicates that there is considerable light attenuation in this film depending on the depth of interaction. This can be minimized by improving light transmission in the LaBr$_3$:Ce film. The main focus of effort is to improve the film quality by determining the growth conditions that produce larger fiber size, better fiber alignment, greater fiber transparency and better light channeling down the fiber.

The data presented here demonstrate the feasibility of growing microcolumnar films of LaBr$_3$:Ce using co-evaporation of LaBr$_3$ and CeBr$_3$, and the efficacy of using such films for radionuclide/x-ray imaging. The technique of co-evaporation provides methods for growing this important material in large area format, while reducing fabrication costs. Furthermore, the deposition process of the present invention also provides some degree of control on film properties, making it possible to tailor their performance for a specific application.

It is understood that the examples and embodiments described herein are for illustrative purposes only and that various modifications or changes in light thereof will be suggested to persons skilled in the art and are to be included within the spirit and purview of this application and scope of the appended claims. Numerous different combinations are possible, and such combinations are considered to be part of the present invention. All publications, patents, patent applications and other references cited herein are also incorporated by reference herein in their entirety.

What is claimed is:

1. An imaging scintillation radiation detector comprising a doped lanthanum halide microcolumnar scintillator formed on a substrate by a process comprising co-evaporating a lanthanum halide salt source from a first source container and a dopant salt source from a second source container for deposition on a substrate surface maintained within a temperature range below a melting point of the lanthanum halide salt and above about 70% of the melting point of the lanthanum salt.

2. The scintillation radiation detector of claim 1, wherein said halide is chlorine, bromine, fluorine, or iodine.

3. The scintillation radiation detector of claim 1, wherein said dopant is at least one of cerium (Ce), europium (Eu), praseodymium (Pr), dysprosium (Dy), samarium (Sm), thallium (Tl), chlorine (Cl), fluorine (Fl), or iodine (I).

4. The scintillation radiation detector of claim 3, wherein said dopant is at least cerium.

5. The scintillation radiation detector of claim 1, wherein said substrate comprises an opaque material.

6. The scintillation radiation detector of claim 5, wherein said opaque material comprises at least one of a coating of a reflective material and a protective material.

7. The scintillation radiation detector of claim 6, wherein said protective material comprises a para-xylylene polymer composition.

8. The scintillation radiation detector of claim 7, wherein the para-xylylene polymer composition is parylene.

9. The scintillation radiation detector of claim 1, wherein said substrate comprises an optically transparent material.

10. The scintillation radiation detector of claim 9, wherein said optically transparent material comprises at least one of a coating of an optically transparent protective material.

11. The scintillation radiation detector of claim 10, wherein the optically transparent protective material comprises a para-xylylene polymer composition.

12. The scintillation radiation detector of claim 1, further comprising at least a protective coating on the surfaces of the scintillator not in contact with the substrate.

13. The scintillation radiation detector of claim 12, wherein said protective coating comprises a para-xylylene polymer composition.

14. The scintillation radiation detector of claim 13, wherein said para-xylylene polymer composition is parylene.

15. The scintillation radiation detector of claim 1, wherein the microcolumnar scintillator comprises an afterglow at 20 milliseconds after excitation that is reduced-compared to afterglow of a crystalline form of the same scintillator composition.

16. The scintillation radiation detector of claim 1, wherein the substrate surface is maintained at a temperature range of about 70% to about 80% of the melting point of the lanthanum halide salt.

17. An imaging scintillation radiation detector device comprising a doped lanthanum halide microcolumnar scintillator formed on a substrate, and an imaging photodetector assembly optically coupled to the scintillator, the scintillator formed by a process comprising evaporating a lanthanum halide source material so as to deposit doped lanthanum halide microcolumnar scintillator on a substrate surface maintained within a temperature range above about 70% of a melting point of the lanthanum halide source material and below the melting point of the lanthanum halide source material.

18. The imaging scintillation radiation detector device of claim 17, wherein the halide is chlorine, bromine, fluorine, or iodine.

19. The imaging scintillation radiation detector device of claim 17, wherein the dopant is at least one of cerium (Ce), europium (Eu), praseodymium (Pr), dysprosium (Dy), samarium (Sm), thallium (Tl), chlorine (Cl), fluorine (Fl), or iodine (I).

20. The imaging scintillation radiation detector of claim 17, wherein said substrate comprises an opaque material or optically transparent material.

21. The imaging scintillation radiation detector of claim 17; further comprising a protective coating on at least a surface of the scintillator not in contact with the substrate.

22. The imaging scintillation radiation detector of claim 17, the substrate comprising a para-xylylene polymer composition.

23. The imaging scintillation radiation detector of claim 22; wherein said para-xylylene polymer composition is parylene.

24. The imaging scintillation radiation detector of claim 17, further comprising a radiation source.

25. A method of performing high-speed radiation imaging detection, comprising:
   providing a imaging scintillation radiation detector device comprising a doped lanthanum halide microcolumnar scintillator, and a photodetector assembly optically coupled to the scintillator; and
   positioning the device such that a radiation source is within a field of view of the scintillator so as to detect emissions from the source, wherein an image frame acquired 20 milliseconds after a prior frame will contain less than 2% of the light content of said prior frame.

26. The method of claim 25, wherein a patient is positioned between the radiation source and the scintillator.

27. The method of claim 25, wherein the radiation source comprises a patient.

28. The method of claim 25, the detector device further comprising a computer control system coupled to the photodetector assembly so that the computer outputs image signals in response to detected radiation from the radiation source.

29. The method of claim 28, further comprising generating an image from the detected radiation.

* * * * *